(12) United States Patent  (10) Patent No.: US 6,540,412 B2
Yonemura et al.  (45) Date of Patent: Apr. 1, 2003

(54) OPTICAL TRANSCEIVER

(75) Inventors: Ryugen Yonemura, Yokohama (JP);
Hisao Go, Yokohama (JP); Toshio Mizue, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/779,481

(22) Filed: Feb. 9, 2001

(65) Prior Publication Data

US 2001/0024551 A1 Sep. 27, 2001

(30) Foreign Application Priority Data

Oct. 5, 2000 (JP) .......................... 2000-306587
Feb. 10, 2000 (JP) .......................... 2000-033963

(51) Int. Cl.$^7$ ................................ G02B 6/36
(52) U.S. Cl. ...................... 385/88; 385/89; 385/92; 385/93; 359/152
(58) Field of Search .................. 385/14, 49, 88–94; 359/152

(56) References Cited

U.S. PATENT DOCUMENTS

| 5,117,476 A | * | 5/1992 | Yingst et al. ............. 385/49 |
| 5,416,668 A | * | 5/1995 | Benzoni ................. 174/35 R |
| 5,452,389 A | * | 9/1995 | Tonai et al. .............. 385/88 |
| 5,528,408 A | * | 6/1996 | McGinley et al. ......... 359/152 |
| 5,535,034 A | * | 7/1996 | Taniguchi ............... 359/152 |
| 5,596,663 A | * | 1/1997 | Ishibashi et al. .......... 361/785 |
| 5,596,665 A | * | 1/1997 | Kurashima et al. ......... 385/88 |
| 5,610,395 A | * | 3/1997 | Nishiyama ............. 250/214 A |
| 5,787,215 A | * | 7/1998 | Kuhara et al. ............ 359/115 |
| 6,213,651 B1 | * | 4/2001 | Jiang et al. .............. 385/88 |
| 6,239,427 B1 | * | 5/2001 | Mizue ................... 250/239 |

FOREIGN PATENT DOCUMENTS

EP 0918238 * 5/1999

OTHER PUBLICATIONS

H. Kurashima et al. "Manufacturing Technique of SFF Transceiver" $49^{TH}$ Electronic Components & Technology Conference, Jun. 1–4, 1999 pp. 554559.

* cited by examiner

Primary Examiner—Hemang Sanghavi
Assistant Examiner—Scott A Knauss
(74) Attorney, Agent, or Firm—Smith, Gambrell & Russell, LLP

(57) ABSTRACT

An optical transceiver 1 comprises a receiver optical sub-module 4, a transmitter optical sub-module 2, and a housing 6 to accommodate these modules. The receiver optical sub-module 4 has a light receiving element, and a receiver electronic circuit substrate 47. The transmitter optical sub-module 2 has a light emitting element, and a transmitter electronic circuit substrate 27. The housing 6 has a receptacle part 61 with which an optical connector is engaged. The receiver electronic circuit substrate 47 and the transmitter electronic circuit substrate 27 are disposed opposite to each other.

22 Claims, 19 Drawing Sheets

OPTICAL TRANSCEIVER

BACKGROUND OF THE INVENTION

1. Field of the Invention

The present invention relates to an optical transceiver having a light emitting element and a light receiving element.

2. Description of the Related Art

An optical transceiver having a light receiving module and a light transmitting module is used for an optical transmission systems such as data links and optical LANs that use light as an information transmission medium. The light receiving module converts an optical signal transmitted via optical fibers to an electric signal and outputs the electric signal. The light transmitting module converts an electric signal to an optical signal. An optical transceiver in related art is configured as shown in FIG. 22.

An optical transceiver 280 shown in FIG. 22 includes a TO metal package 283, an electronic circuit substrate 281, a resin mold part 282, and lead pins 284. The TO metal package 283 is engaged with an optical connector. The electronic circuit substrate 281 has an electronic circuit for processing an electric signal corresponding to an optical signal transmitted or received to/from the optical connector formed thereon. The resin mold part 282 is used for fixing the TO metal package 283 and the electronic circuit substrate 281. The lead pins 284 are used for connecting the electronic circuit substrate 281 with an external mounting substrate. The light emitting element and light receiving element, not shown in FIG. 22, are housed in the TO metal package 283 and protected from an external electromagnetic noise.

However, in the optical transceiver 280 of the related art, the electronic circuit substrate 281 is extended in a horizontal direction, that is, a direction where a light emitting element and a light receiving element were arranged in parallel to each other. Accordingly, it has not been impossible to narrow the spacing between the light emitting element and the light receiving element. As a result, in the related art, the optical transceiver suffered from a disadvantage that it could not support small-sized optical connectors.

Further, as the optical signal to be transmitted travels at a high speed, over 1 Gbps, the influence of an electromagnetic noise between a light emitting element and a light receiving element or between a driving circuit for the light emitting element and a circuit for the light receiving element becomes serious thus having adverse effects on the receiving sensitivity characteristics.

SUMMARY OF THE INVENTION

Accordingly, it is an object to provided a small-sized optical transceiver with a narrower spacing between a light emitting element and a light receiving element and with a structure that can realize stable operation in transmission speeds exceeding 1 Gbps.

An optical transceiver according to the invention comprises a receiver optical sub-module, a transmitter optical sub-module, and a housing to accommodate these modules. The receiver optical sub-module has a light receiving element for receiving an optical signal from a receiver optical fiber and a receiver electronic circuit substrate having an electronic circuit formed thereon. The electronic circuit processes output signals from the light receiving element. The transmitter optical sub-module has a light emitting element to transmit an optical signal to a transmitter optical fiber and a transmitter electronic circuit substrate having an electronic circuit formed thereon. The electronic circuit processes input signals to the light emitting element. The housing has a receptacle part with which an optical connector is engaged that accommodates the receiver optical fiber and the transmitter optical fiber. The receiver optical sub-module and the transmitter optical sub-module are attached to the housing. In this optical transceiver, the receiver electronic circuit substrate and the transmitter electronic circuit substrate are disposed opposite to each other. Preferably, the transmitter electronic circuit substrate may be substantially parallel to the receiver electronic circuit substrate in their longitudinal direction. Further, a surface of the transmitter electronic circuit substrate where the electronic circuit is formed may be substantially parallel to a surface of the receiver electronic circuit substrate where the electronic circuit is formed. The surface of the transmitter electronic circuit substrate where the electronic circuit is formed may be opposite to the surface of the receiver electronic circuit substrate where the electronic circuit is formed. Thus, by arranging the receiver electronic circuit substrate in an opposed position to the transmitter electronic circuit substrate, the receiver electronic circuit substrate and the transmitter electronic circuit substrate can be arranged in the close proximity.

In the optical transceiver, it is preferable that the optical transceiver further comprises an electrical shield plate arranged between the receiver optical sub-module and the transmitter optical sub-module. Thus, by providing an electrical shield plate, it is possible to reduce the effects of an electromagnetic noise mutually generated between the receiver optical sub-module and the transmitter optical sub-module. This electrical shield plate is preferably composed of a conducting plate having a grounding terminal.

In the optical transceiver, it is also preferable that the housing comprises a mounting portion on which the receiver optical sub-module and the transmitter optical sub-module are mounted and a conductive cover for covering the receiver optical sub-module and the transmitter optical sub-module and being coupled to the mounting portion. The cover has a grounding terminal. In this way, by providing a conductive cover to cover the receiver optical sub-module and the transmitter optical sub-module and to have the grounding terminal, it is possible to reduce the effects of an external electromagnetic noise on the receiver optical sub-module and the transmitter optical sub-module.

In the optical transceiver, it is preferable that the receiver optical sub-module further has a metal receiver optical sub assembly, the transmitter optical sub-module further has a metal transmitter optical sub assembly, and the receptacle part is engaged with an optical connector that accommodates the receiver ferrule and the transmitter ferrule. The metal receiver optical sub assembly accommodates a light receiving element therein and has a receiver sleeve for engaging with a receiver ferrule provided at the tip of the receiver optical fiber. The metal transmitter optical sub assembly accommodates a light emitting element and has a transmitter sleeve for engaging with a transmitter ferrule provided at the tip of the transmitter optical fiber.

In the optical transceiver, the receiver optical sub assembly may have a metal stem, a metal lens holder hermetic sealed to the metal stem, and a metal receiver sleeve.

In this way, via a configuration where metal members are combined, alignment of a light receiving element with an optical fiber is made easy and the electromagnetic noise is effectively reduced.

In the optical transceiver, the light receiving element may be mounted on a parallel-plate capacitor installed on the metal stem.

In this way, by mounting the light receiving element on a parallel-plate capacitor, it is possible to reduce the area of the stem and the bypass effect of an electromagnetic noise is provided for a signal whose transmission speed exceeds 1 Gbps.

In the optical transceiver, the receiver optical sub assembly may comprise five external lead pins and connected to a receiver electronic circuit substrate so that the length of the ground lead pin provided in the center of the metal stem may be shortest.

Via such a configuration, it is possible to enhance the resistance against an electromagnetic noise from a high-frequency wave whose transmission speed exceeds 1 Gbps.

In the optical transceiver, the receiver optical sub assembly and the transmitter optical sub assembly preferably have an operating speed equal to or greater than 1.0 Gbps.

In the optical transceiver, the transmitter optical sub assembly may have a metal stem, a metal lens holder hermetic sealed to the metal stem, an aligning member laser welded to the metal lens holder, and a transmitter sleeve laser welded to the aligning member.

Via such a configuration, alignment of a light emitting element with an optical fiber is made easy and light from a light emitting device can be efficiently guided to an optical fiber. Via a configuration where metal members are combined, the electromagnetic noise is effectively reduced.

In the optical transceiver, the transmitter sleeve preferably has a fiber stub, a sleeve for holding the fiber stub, a metal bush for holding the sleeve, and a protective member for holding the bush and the sleeve.

In the optical transceiver, the center of the metal stem may be inclined against the common optical axis connecting the sleeve, fiber stub and lens holder.

Via such a configuration, it is possible to prevent a reflected light coming from the surface of a light receiving device mounted in an inclined face in order to monitor the back light of the light emitting device from returning to the light emitting device again. Thus, it is possible to operate the light emitting device in a high-frequency range.

In the optical transceiver, it is preferable that the metal stem comprises at least three lead pins and that at least one of the lead pins is electrically connected to the metal stem. The transmitter optical sub assembly preferably has an operating speed equal to or greater than 1.0 Gbps An optical transceiver according to the invention comprises (1) a first opto-electrical conversion device and (2) a housing. The first opto-electrical conversion device can convert one of an optical signal or an electric signal to the other. The housing (2) has (2a) a first receptacle provided to receive an optical connector, (2b) a first shield member for electrically shielding the first receptacle, and (2c) a second shield member for electrically shielding the first opto-electrical conversion device. In this optical transceiver, the first shield member is isolated from the second shield member.

The first shield member for electrically shielding the first receptacle is provided to assure electrical isolation from the second shield member for electrically shielding the first opto-electrical conversion device. Thus it is possible to reduce the electromagnetic effects on the first shield member directly propagated to the second shield member.

Characteristics according to the invention can be arbitrarily combined, and accordingly, each action and each effect and an action and an effect a combination thereof can be provided.

In an optical transceiver according to the invention, the housing (2) may have (2c) an insulating member for electrically insulating the first shield member from the second shield member. Via the insulating member, electrical isolation between the first shield member and the second shield member is assured.

In an optical transceiver according to the invention, the housing (2) may have (2d) a receptacle member where the first receptacle is provided and (2e) a mounting member for mounting the first opto-electrical conversion device. The first shield member may comprise a conductive member provided on the receptacle member. Providing a first shield on the receptacle member serves to reduce a noise radiated from the receptacle. The second shield member may comprise a conductive covering member for sandwiching a first opto-electrical conversion device against a mounting member. Providing the second shield member with a covering member is effective for reducing a radiated noise from the first opto-electrical conversion device.

In an optical transceiver according to the invention, the second shield member may have a terminal provided to stick out from the substrate mounting surface of the housing. This terminal can be used to connect the second shield member to the reference potential line of a mounting member on which the optical transceiver is to be mounted. In an optical transceiver according to the invention, the second shield member may be connected to the reference potential line of a first opto-electrical conversion device. Via this configuration, a stable shield performance is obtained without electrical arrangement of the optical transceiver.

In an optical transceiver according to the invention, the housing (2) may have (2f) a terminal member having conductivity. The terminal member (2f) may have a contact part provided to allow electrical connection to the first shield member and a terminal provided to stick out from the substrate mounting surface of the housing. This terminal member can be used to electrically connect the first shield member to the reference potential line of the cabinet of apparatus for accommodating the optical transceiver.

An optical transceiver according to the invention may further have (3) a second opto-electrical conversion device. The housing (2) has a second receptacle provided to receive (2g) an optical connector. The second opto-electrical conversion device can convert one of an optical signal or an electric signal to the other. The second opto-electrical conversion device is accommodated in the housing so that the second opto-electrical conversion device can be optically connected to the second receptacle. The second receptacle is electrically shielded by the first shield member. The second opto-electrical conversion device is electrically shielded by the second shield member.

Via this embodiment, even in an optical transceiver comprising a plurality of opto-electrical conversion devices, it is possible to reduce the electromagnetic effects on the first shield member for electrically shielding the first receptacle directly propagated to the second shield member for electrically shielding the first opto-electrical conversion device.

In an optical transceiver according to the invention, the first shield member is provided to allow shielding between the first opto-electrical conversion device and the second opto-electrical conversion device. Via this, a radiation noise from the first and the second opto-electrical conversion devices is reduced and a mutual interference between the first and the second opto-electrical conversion devices.

In an optical transceiver according to the invention, the first shield member can comprise a plate coating provided on the receptacle member. Via the conductive coating provided on the receptacle member, a conductive material for shielding can be realized. This embodiment is effective for reducing a radiated noise from the receptacle.

BRIEF DESCRIPTION OF THE DRAWINGS

FIGS. 16A–16D respectively show opto-electrical conversion devices;

DETAILED DESCRIPTION OF THE PREFERRED EMBODIMENT

Preferable embodiments of an optical transceiver according to the invention will be detailed referring to drawings. Same signs are given to same elements in description of drawings and repeated description is omitted. Dimension scale of drawings is not necessarily the same as that is in the description.

(First Embodiment)

Figure 1:
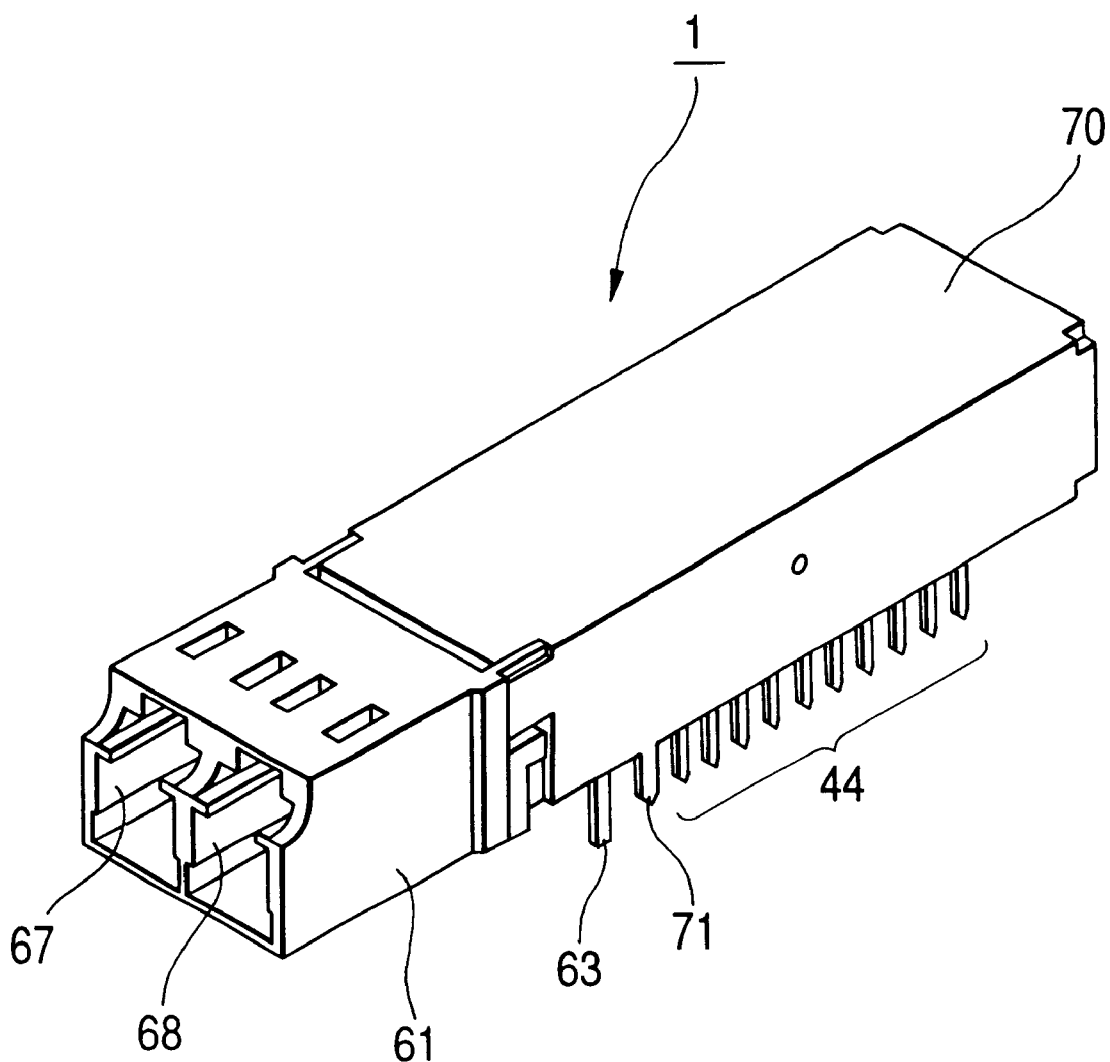
FIG. 1 is a perspective view showing an optical transceiver according to the first embodiment.
Figure 2:
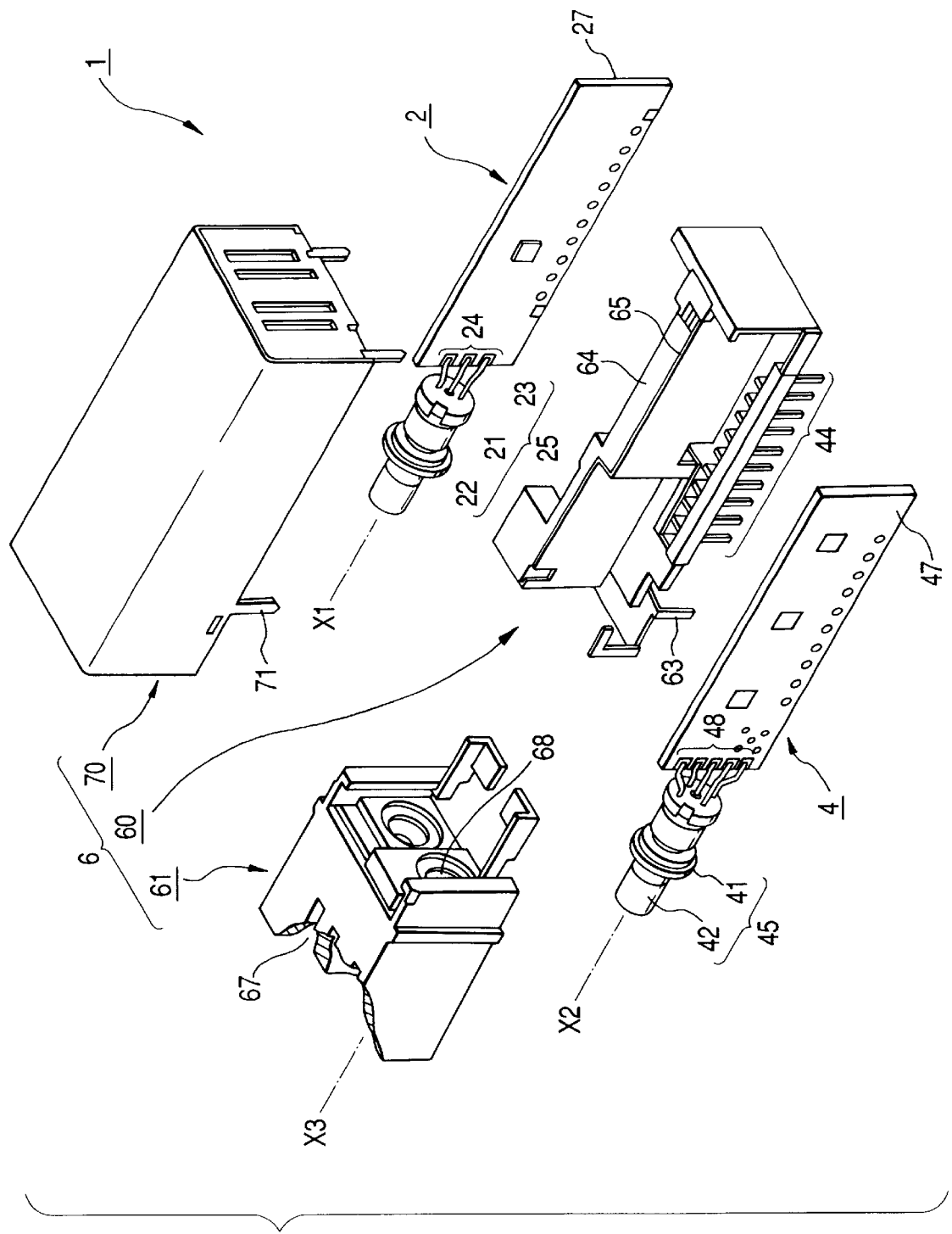
FIG. 2 is an exploded perspective view showing the optical transceiver according to the first embodiment.

FIG. 1 is a perspective view showing an optical transceiver 1 according to this embodiment. FIG. 2 is an exploded perspective view showing the optical transceiver 1 according to this embodiment.

First, for the approximate shape of the optical transceiver 1 according to this embodiment, the optical transceiver 1 according to this embodiment has a substantially rectangular parallelepiped shape as shown in FIG. 1. The optical transceiver 1 has a receptacle part 61 provided at one end and external lead pins 44 sticking out from a bottom surface in FIG. 1.

Next, parts configuring the optical transceiver 1 will be explained. As shown in FIG. 2, the optical transceiver 1 according to this embodiment includes a transmitter optical sub-module 2, a receiver optical sub-module 4 and a housing 6. The transmitter optical sub-module 2 transmits an optical signal. The receiver optical sub-module 4 receives an optical signal. These sub-modules are attached to the housing 6 (comprising a housing main body 60, a receptacle part 61 and a cover 70).

The transmitter optical sub-module 2 has a transmitter optical sub assembly 25 and a transmitter circuit substrate 27. The transmitter optical sub assembly 25 is composed of a metal sleeve 22 in the shape of a cylinder (corresponding to "a transmitter sleeve" according to the invention), a metal lens holder 21 in a cylindrical shape integrated with the sleeve 22, and a metal stem 23 in the shape of a disc. The metal sleeve and metal lens holder formed of resin with metal coating or metal plating have the same effect as the metal sleeve and metal lens holder only made of metal. The transmitter optical sub assembly 25 and the transmitter circuit substrate 27 are electrically connected via a plurality of (three in this example) external lead pins 24 sticking out from the metal stem 23 of the transmitter optical sub assembly 25. The sleeve 22 has an inner diameter to allow a 1.25-mm-diameter ferrule to be inserted.

The receiver optical sub-module 4 has a receiver optical sub assembly 45 and a receiver circuit substrate 47. The receiver optical sub assembly 45 is composed of a metal sleeve 42 in the shape of a cylinder, a metal lens holder 41 in a cylindrical shape connected to the sleeve 42, and a metal stem 43 in the shape of a disc. The metal sleeve and metal lens holder formed of resin with metal coating or metal plating have the same effect as the metal sleeve and metal lens holder only made of metal. The receiver optical sub assembly 45 and the receiver circuit substrate 47 are electrically connected via a plurality of (five in this example) external lead pins 48 sticking out from the metal stem 43 of the receiver optical sub assembly 45. The sleeve 42 has an inner diameter equivalent to that of the sleeve 22 provided in the transmitter optical sub assembly 25.

Next, referring to FIG. 3, the receiver optical sub assembly (ROSA) 45 will be explained.

Figure 3:
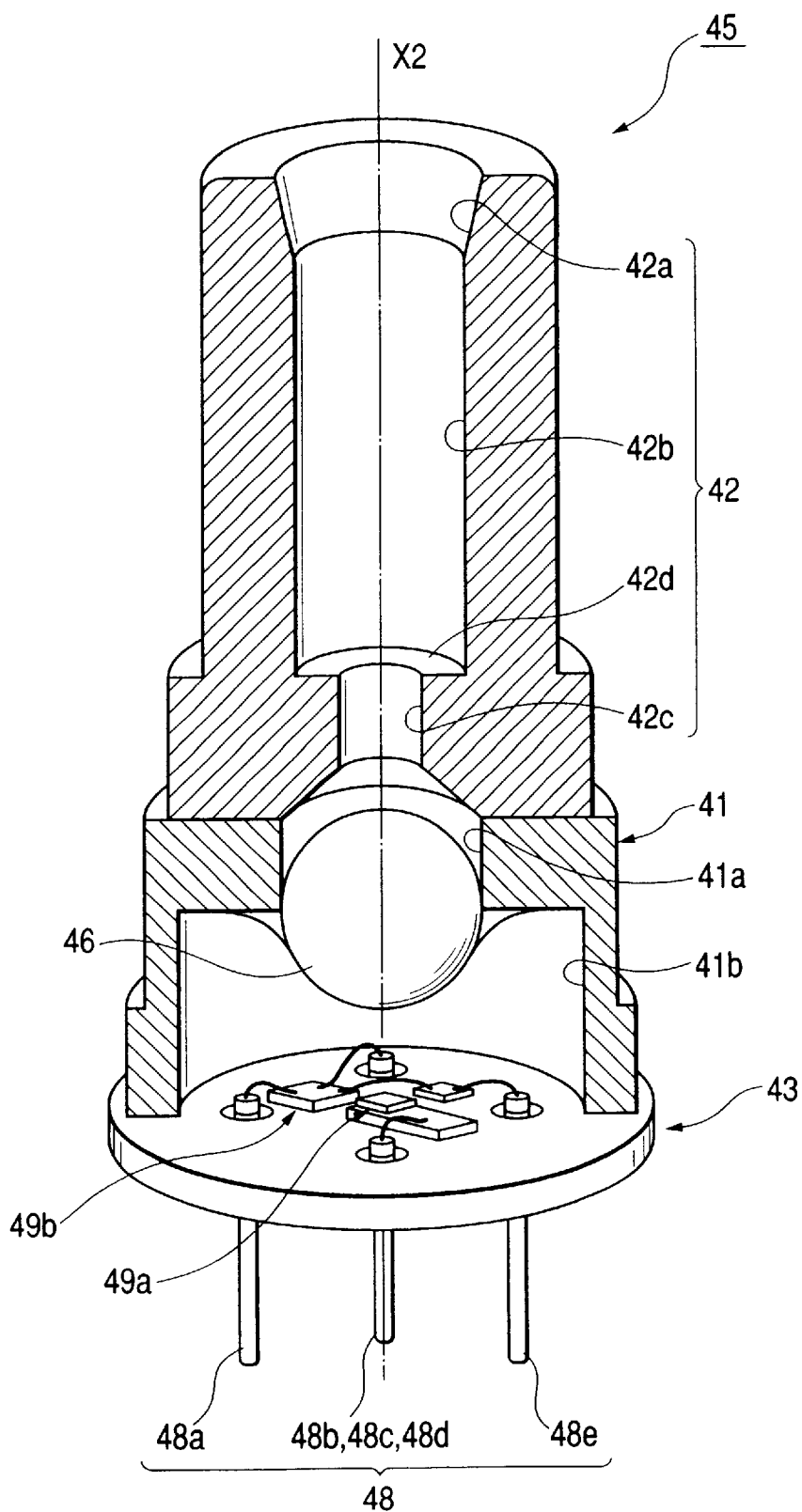
FIG. 3 is a partial sectional view showing a receiver optical sub-module.

FIG. 3 is a partial sectional view showing the receiver optical sub assembly 45. The receiver optical sub assembly 45 has a structure where the metal sleeve 42, the metal lens holder 41 and the metal stem 43 are layered along a single axis X2. An opening 42a of the sleeve 42 has an inner diameter tapered outward (upward in FIG. 3) in order to assure easy engagement with a ferrule of an optical fiber. At a center 42b the inner diameter is constant and at an innermost part 42c the inner diameter is narrowest. At the boundary of the center 42b and the innermost part 42c is provided a bump. The position of a tip of the optical fiber is determined when a tip of the ferrule of the optical fiber abuts this bump face 42d. Material of the sleeve 42 is generally a stainless steel or the resin with metal coating or metal plating.

The lens holder 41 is in the cylindrical shape and has an opening 41a and a center 41b. A lens 46 is accommodated in the opening 41a. The lens 46 may be a glass lens or a plastic lens. While the lens 46 is a spherical lens in FIG. 3, the lens 46 is not necessarily a spherical lens. The lens 46 is fixed to the lens holder 41 by way of adhesive. In the hollow shaped center 41b are accommodated electronic components such as a light receiving element 49a, a receiver preamplifier 49b and an electronic component such as a die cap. The lens holder 41 is fixed to the sleeve 42 via welding three parts on the perimeter of the sleeve 42. Material of the lens holder 41 is generally a stainless steel.

At a rear (at a bottom in FIG. 3) of the lens holder 41 is connected the metal stem 43. On the stem 43 are mounted electronic components such as the semiconductor light receiving element 49a and the receiver preamplifier 49b. Toward the rear of the stem 43 stick out the plurality of (five in this example) lead pins 48a through 48e. The center lead pin 48c is in direct electric contact with the stem 43. The other lead pins (48a, 48b, 48d, 48e) are insulated from the stem 43.

Figure 4:
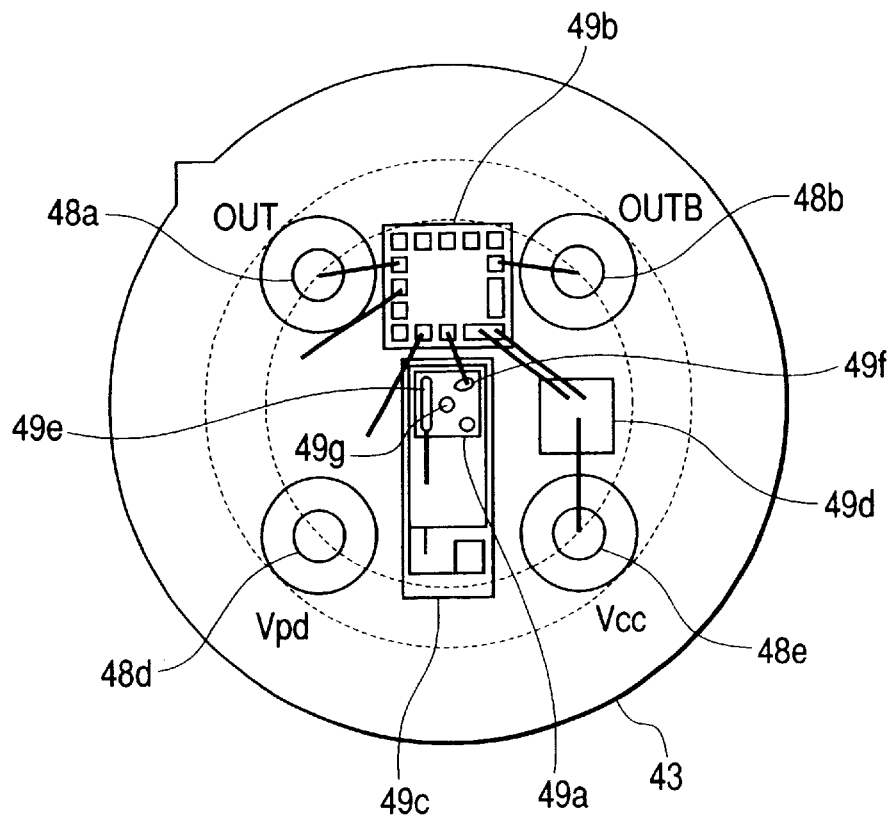
FIG. 4 shows electronic components mounted on a stem.

FIG. 4 shows electronic components arranged on the stem 43. Four lead pins (48a, 48b, 48d, 48e) other than the pin 48c in direct electric contact with the stem 43 stick out above the stem 43. The lead pins are insulated from the stem 43 via a known method, for example glass sealing. Four electronic components, that is, the light receiving element 49a, the receiver preamplifier 49b and two parallel-plate capacitors (49c, 49d), are mounted on the stem 43. The light receiving element 49a is mounted on the first parallel-plate capacitors 49c. On the upper electrode of the capacitor 49c is formed a metal wiring pattern, on which the light receiving element 49a is mounted.

The light receiving element 49a may be a surface-detecting InGaAs-PIN photodiode, and has a sensitivity to light with a wavelength in the 1.3 $\mu$m band. Adjusting the composition using the same material can provide a photodiode having a sensitivity to light with a wavelength in the 1.55 $\mu$m band. On the surface of the light emitting element 49a are a light-intercepting face 49g, a first electrode 49e and a second electrode 49f. The diameter of the light-intercepting face 49g is 50 $\mu$m thus the capacitance of junction is reduced.

The first electrode 49e of the light receiving element 49a is wire-bonded with the upper surface electrode of the first capacitor. The second electrode 49f is directly bonded with one of the surface metal patterns of the receiver preamplifier 49b. Two of the surface metal patterns of the receiver preamplifier 49b are wire-bonded with the lead pins 48a, 48b. Output signals can be extracted from these two lead pins 48a, 48b. The other metal patterns of the receiver preamplifier 49b are directly wire-bonded with the stem 43 and electrically connected to the lead pin 48c not shown in FIG. 4 and feeds the negative power supply to the receiver preamplifier 49b. The positive power supply is fed to the receiver preamplifier 49b via the lead pin 48e and the second capacitor 49d.

The electromagnetic shielding performance is provided by feeding power supply to the light receiving element 49a and the receiver preamplifier 49b via the two capacitors 49c and 49d, by mounting the light receiving element 49a on the parallel-plate capacitor 49c and by using the stem 43 made of metal and the lens holder 41 made of metal for covering the space where these electronic devices are mounted. Thus, it is possible to stabilize the operation of the receiver optical sub assembly (ROSA) for signal speeds exceeding 1 Gbps.

Figure 5:
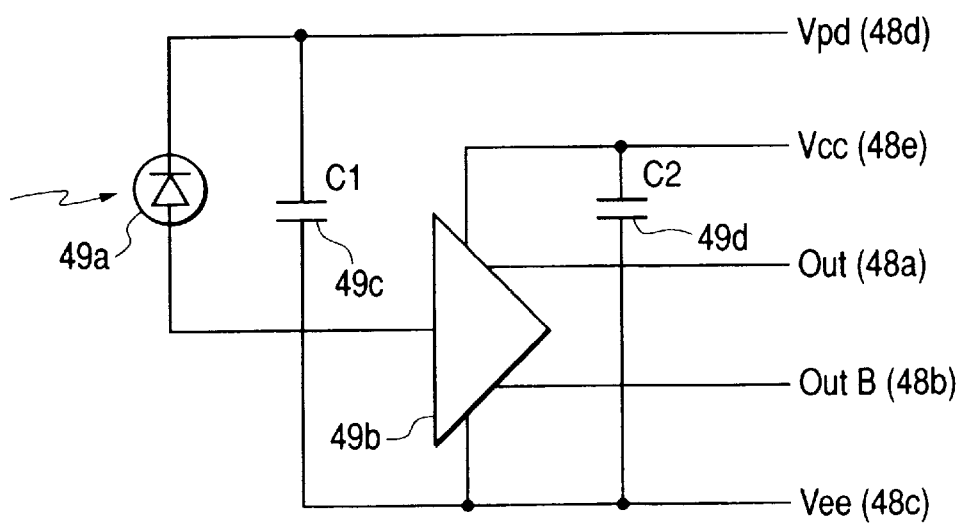
FIG. 5 shows a circuit of the receiver optical sub module.

FIG. 5 shows the circuit of the receiver optical sub assembly 45. When a signal light is input to the light receiving element 49a, the input signal light undergoes opto-electrical conversion and output as an optical current signal. The output optical current signal is input to the receiver preamplifier 49b. The receiver preamplifier 49b performs current-voltage conversion and generates complementary signals whose phase differ from that of the optical current signal by 180 degrees and outputs the resulting complementary signals as Out and Out B. To the cathode of the light receiving element 49a is fed a power supply voltage Vpd via the lead pin 48d. On the other hand, a positive power supply voltage Vcc of the receiver preamplifier 49b is fed from the lead pin 48e. A negative power supply voltage Vee is fed from the lead pin 48c directly connected to the stem 43.

Figure 6:
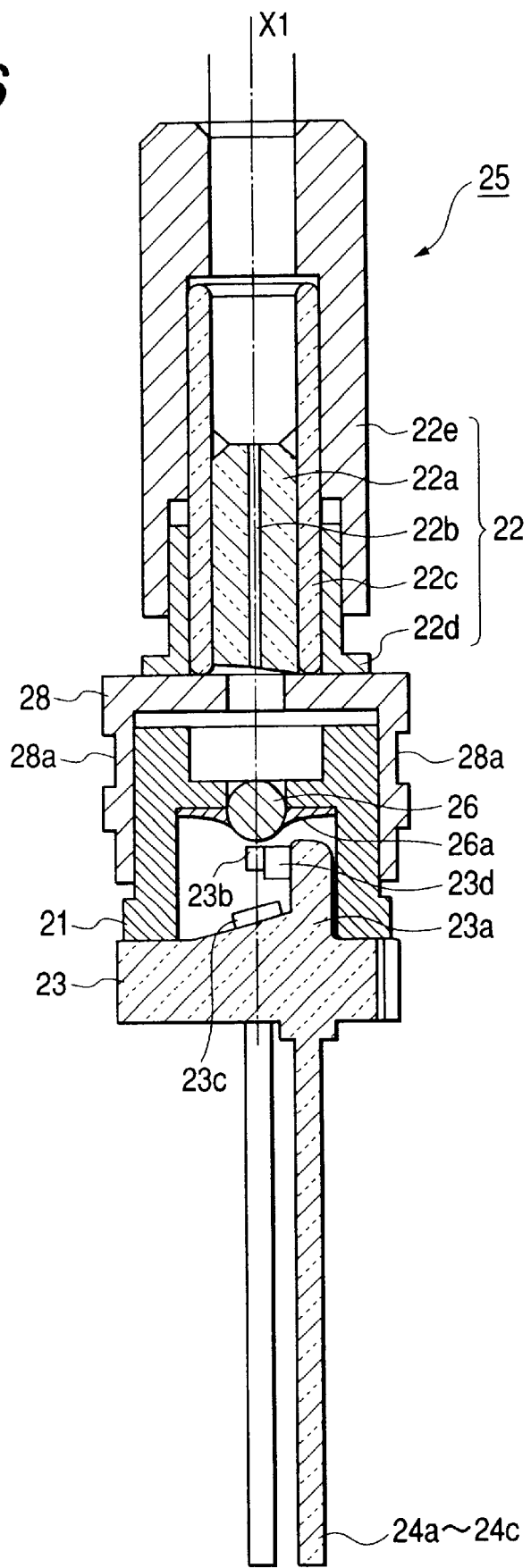
FIG. 6 is a sectional view showing the configuration of a transmitter optical sub module.

FIG. 6 is a sectional view showing the configuration of the transmitter optical sub assembly 25. The transmitter optical sub assembly 25 has a metal stem 23 having three lead pins 24a through 24c, a metal lens holder 21, a sleeve 22 and an aligning member 28. These parts share an optical axis X1 in common. The surface of the stem 23 comprises a device mounting convex part 23a in order to align the light emitting end face of the end face light emitting device to the optical axis. On the convex part 23a is mounted a light emitting element 23b via a chip carrier 23d. A face that is opposed to the optical axis X1 of the stem 23 is inclined against the optical axis X1 and on this face a detector photodiode 23c is mounted for monitoring the back light of the light emitting element 23b. Since the detector photodiode 23c is mounted on the inclined face, it is possible to suppress a back light reflected on the surface of the detector photodiode 23 and returning to the light emitting element 23b again.

To the stem 23, the metal lens holder 21 is hermetic sealed, for example, by resistance welding, and has a space for accommodating semiconductor devices 23b and 23c. At the part of the lens holder 21 corresponding to the optical axis X is fixed a glass sphere lens 26 via a seal glass 26a. The seal glass 26a completely seals the space for accommodating the device. Thus, the semiconductor devices 23b and 23c are not exposed to atmosphere thus enhancing the long-term reliability of the transmitter optical sub assembly 25. Material of the lens holder 21 is generally a stainless steel.

The aligning member 28 is fixed to cover the upper part of the lens holder 21. The aligning member 28 has a first opening opposed to the lens holder 21 and a second opening opposed to a fiber stub 22a (described later). The inner diameter of the first opening substantially matches the outer diameter of the lens holder 21. The lens holder 21 is accommodated in the first opening. By minutely moving the aligning member 28 along the optical axis X in the first opening, it is possible to adjust the distance between the end face of the fiber stub 22a and the light emitting end face of the light emitting element 23b, thereby allowing fine alignment in Z axis (a direction parallel with the optical axis X1). After the alignment, the aligning member 28 and the lens holder 21 are fixed together by laser welding a thin part 28a of the aligning member 28.

On the upper face of the aligning member 28 is fixed the sleeve 22. The sleeve 22 has, form the inner side thereof, the fiber stub 22a, a split sleeve 22c, a bush 22d and a protecting member 22e. The end face of the fiber stub 22a is aligned with zirconia (ZrO) by penetrating the optical fiber 22b from the center of the material using an oxide such as zirconia and by polishing them together with the zirconia to make the end face thereof the same as zirconia. The fiber stub 22a penetrates in the split sleeve 22c. The bush 22d protects the split sleeve 22c. The length of the fiber stub 22a is approximately half that of the split sleeve 22c. The end face opposed to the lens 26 of the fiber stub 22a is polished with a significant angle against the optical axis so that when light from the light emitting element 23b is reflected on this end face, the light is reflected in a direction different from that of the optical axis X1 thereby preventing the reflected light retuning to the light emitting element 23b. Fixing of the fiber stub 22a through insertion into the split sleeve 22c, fixing of the split sleeve 22c through insertion into the bush 22d, and fixing of the split sleeve 22c through insertion into protecting member 22e are all made via press fitting.

Alignment of the sleeve 22 and the aligning member 28 is made in the following way. First, the light emitting element 23b mounted on the stem 23 is actually caused to emit light. The light is monitored from an optical fiber via a connector (not shown) engaged with the sleeve 22. The sleeve 22 is minutely moved in the direction perpendicular to the optical axis X1 (X-Y) on the aligning member 28 to determine the maximum optical coupling position. In this state, the bush 22 of the sleeve 22 is laser welded with the upper face of the aligning member 28. Then, the sleeve 22 fixed to the aligning member 28 is slid in the direction parallel to the optical axis X between the first opening of the aligning member 28 and the lens holder 21 to perform fine alignment in the Z axis direction. With the optimum optical coupling position determined, the thin part 28a of the aligning member 28 and the lens holder 21 are laser welded. In order to prevent possible misalignment caused by mechanical distortion during welding, it is desirable that the laser welding is performed in an asymmetrical position to the optical axis X1.

Description follows referring to FIGS. 1 and 2 again. The housing 6 is engaged with an optical connector. The housing 6 has the housing main body 60 where sub-modules 2, 4 are mounted, the receptacle part 61 engaged with the housing main body 60, and the cover 70 for covering the transmitter optical sub-module 2 and the receiver optical sub-module 4. The housing 6 is in the shape of a substantially rectangular parallelepiped with the cover 70 coupled with the housing main body 60. The housing main body 60 is formed of an insulating plastic resin and the cover 70 is formed of a metal. The receptacle part 61 has through holes 67 and 68 that penetrate the housing 6 from the innermost part to the outermost part in the direction parallel to the axis X3 shown in FIG. 2. The shape of the through holes 67 and 68 at the outermost part side of the housing 6 is designed to be engaged with optical connector. The shape of the through holes 67 and 68 at the innermost part side of the housing 6 is designed to receive sleeves 22 and 42 respectively provided on the transmitter optical sub-module 2 and the receiver optical sub-module 4. At the lower part of the housing main body 60 in the proximity of the receptacle part 61 are provided two stud pins 63 (only one of them is shown) for fixing the optical transceiver 1 to a circuit substrate (not shown). The stud pins 63 will be described later.

In the transmitter optical sub-module 2 and the receiver optical sub-module 4, the transmitter electronic circuit substrate 27 and the receiver electronic circuit substrate 47 are arranged in opposed positions in order to reduce spacing between the sleeves 22 and 42 provided on the respective sub-modules. More particularly, a surface of the transmitter electronic circuit substrate 27 where the electronic circuit is formed is substantially parallel to a surface of the receiver electronic circuit substrate 47 where the electronic circuit is formed in their longitudinal direction. The sleeves 22, 42 are inserted from the inner part of the housing 6 into the receptacle part 61. External lead pins 44 stick out outside the housing 6 from an opening. The center spacing between the sleeves 22 and 42 in the optical transceiver 1 according to this embodiment is 6.25 mm.

Figure 7:
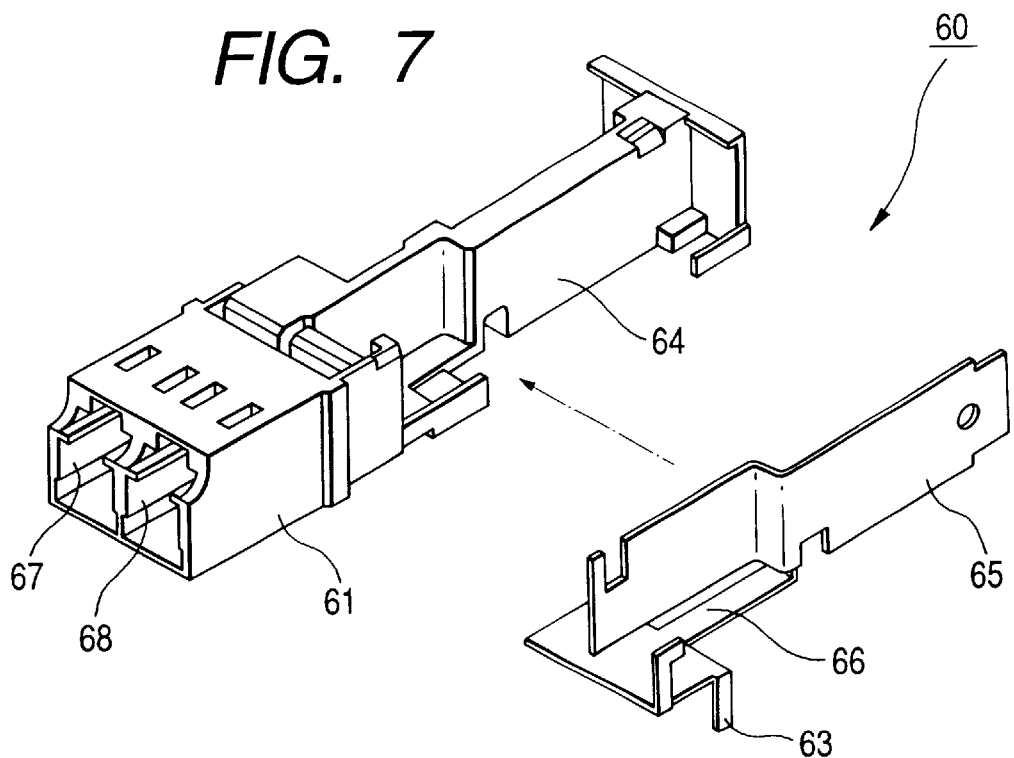
FIG. 7 is an exploded perspective view of a housing main body.

Between the transmitter optical sub-module 2 and the receiver optical sub-module 4 arranged as mentioned earlier, a partition wall 64 that is a part of the housing main body 60 is formed as-shown in FIG. 2. On the side of the partition wall on which the receiver optical sub-module 4 is attached is fixed a metal shield 65 composed of a thin metal plate along the partition wall 64. The metal shield 65 is integrated with a metal conductive member 66 provided at the lower part of the housing main body 60 and the aforementioned stud pin 63 provided the conductive member 66, as shown in FIG. 7. The stud pin 63 also servers as a ground pin for the metal shield 65.

As shown in FIG. 2, the metal cover 70 for covering the transmitter optical sub-module 2 and the receiver optical sub-module 4 has a grounding terminal 71 to play the role of an electromagnetic shield. While in the optical transceiver 1 according to this embodiment, the cover 70 has the grounding terminal 71, only the stud pin 63 may be used as a grounding terminal by causing the cover 70 and the metal shield 65 to come in contact at a predetermined position.

As mentioned earlier, the transmitter optical sub-module 2 and the receiver optical sub-module 4 are attached to the housing main body 60. In this state, the cover 70 is closed to cover the transmitter optical sub-module 2 and the receiver optical sub-module 4 to configure the optical transceiver 1 according to this embodiment as shown in FIG. 1.

Next, the operation of the optical transceiver 1 according to this embodiment will be described. The optical transceiver 1 according to this embodiment is used for an interface part that transmits/receives an optical signal passing through an optical fiber in an optical communications system such as an optical LAN. That is, in the optical transceiver 1, the receptacle part 61 is engaged with an optical connector accommodating an optical fiber. The lead pins 44 sticking out from the bottom of the optical transceiver 1 are electrically connected to a circuit substrate that mounts the optical transceiver 1.

The optical signal passing through the optical fiber is received and converted to an electric signal by the receiver optical sub-module 4 and the resulting electric signal is transmitted to the circuit substrate via lead pins 44. The electrical signal transmitted via lead pins (not shown) of the transmitter optical sub-module 2 is converted to an optical signal by the transmitter optical sub-module 2 and the resulting optical signal is transmitted to the optical fiber via the optical connector engaged with the receptacle part 61.

In the transmitter optical sub-module 2 and the receiver optical sub-module 4 of the optical transceiver 1 according to this embodiment, electric circuit substrates 27 and 47 in the respective sub-modules are arranged in opposed positions. Specifically, in the present invention, it can be said that the transmitting electronic circuit substrate 27 is substantially parallel to the receiver electronic circuit substrate 47 in their longitudinal direction. Further, it can be said that a surface of the transmitter electronic circuit substrate 27 where the electronic circuit is formed is substantially parallel to a surface of the receiver electronic circuit substrate 47 where the electronic circuit is formed. Moreover, it can be said that the surface of the transmitter electronic circuit substrate 27 where the electronic circuit is formed is opposite to the surface of the receiver electronic circuit substrate 47 where the electronic circuit is formed. In the transmitter optical sub-module 2, the transmitter optical sub assembly 25 and the transmitter electronic circuit substrate 27 are arranged on the axis X1. In the receiver optical sub-module 4, the receiver optical sub assembly 45 and the receiver electronic circuit substrate 47 are arranged on the axis X2. Thus, by opposing the electric circuit substrate 27 to the electric circuit substrate 47, it is possible to reduce spacing between the transmitter optical sub assembly 25 and the receiver optical sub assembly 45. Via this procedure, it is possible to reduce spacing between the through hole 67 for inserting the sleeve 22 of the transmitter optical sub-module 2 and the through hole 68 for inserting the sleeve 42 of the receiver optical sub-module 4, thus scaling down the receptacle part 61. Providing a sleeve center spacing of 6.25 mm and the inner diameter of the sleeves to accommodate 1.25-mm-diameter ferrule as shown in the optical transceiver 1 according to the embodiment can realize an optical transceiver 1 that can be engaged with an LC connector currently in widespread use.

In the optical transceiver 1 according to this embodiment, the metal shield 65 is provided between the transmitter optical sub-module 2 and the receiver optical sub-module 4. This reduces the effects of an electromagnetic noise, which is generated in the receiver optical sub-module 4 when an optical signal is converted to an electric signal, in the transmitter optical sub-module 2. This also reduces the effects of an electromagnetic noise, which is generated in the transmitter optical sub-module 2 when an electric signal is converted to an optical signal, in the receiver optical sub-module 4. This is especially effective because in case electronic circuit substrates 27 and 47 in each of the transmitter optical sub-module 2 and the receiver optical sub-module 4 are arranged in opposed positions and positioned in close proximity, the effects of an electromagnetic noise is expected to be greater, as in the optical transceiver 1 according to this embodiment.

In the optical transceiver 1 according to this embodiment, the cover 70 for covering the transmitter optical sub-module 2 and the receiver optical sub-module 4 is formed of a metal and has the grounding terminal 71. Thus, compared with a case where the housing 6 is composed of plastics alone, the effects of an external electromagnetic noise on the transmitter optical sub-module 2 and the receiver optical sub-module 4 can be reduced. The need for using a TO semiconductor package utilized in related art to protect a light emitting element and a light receiving element from an external electromagnetic noise is eliminated. Spacing between the light emitting element and the light receiving element is no longer dependent on the size of this semiconductor package.

In the optical transceiver 1 according to this embodiment, the power supply is fed to the light receiving element 49$a$ and the receiver preamplifier 49$b$ via the two capacitors 49$c$ and 49$d$. The light receiving element 49$a$ is mounted on the parallel-plate capacitor 49$c$. The stem 43 and the lens holder 41 are made of metal. Thus, it is possible to stabilize the operation of the receiver optical subassembly (ROSA) for signal speeds exceeding 1 Gbps.

(Second Embodiment)

An optical transceiver according to the second embodiment of the invention will be explained. An optical transceiver according to the second embodiment of the invention differs from an optical transceiver according to the first embodiment of the invention in that optical elements and electronic circuit substrates in the transmitter optical sub-module and the receiver optical sub-module are molded with resin.

Figure 8:
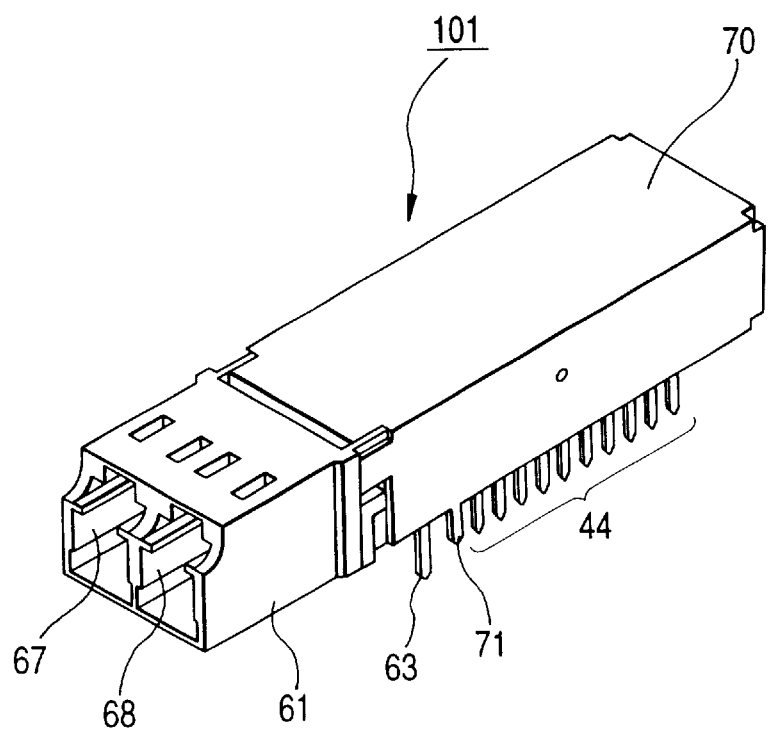
FIG. 8 is a perspective view showing an optical transceiver according to the second embodiment.
Figure 9:
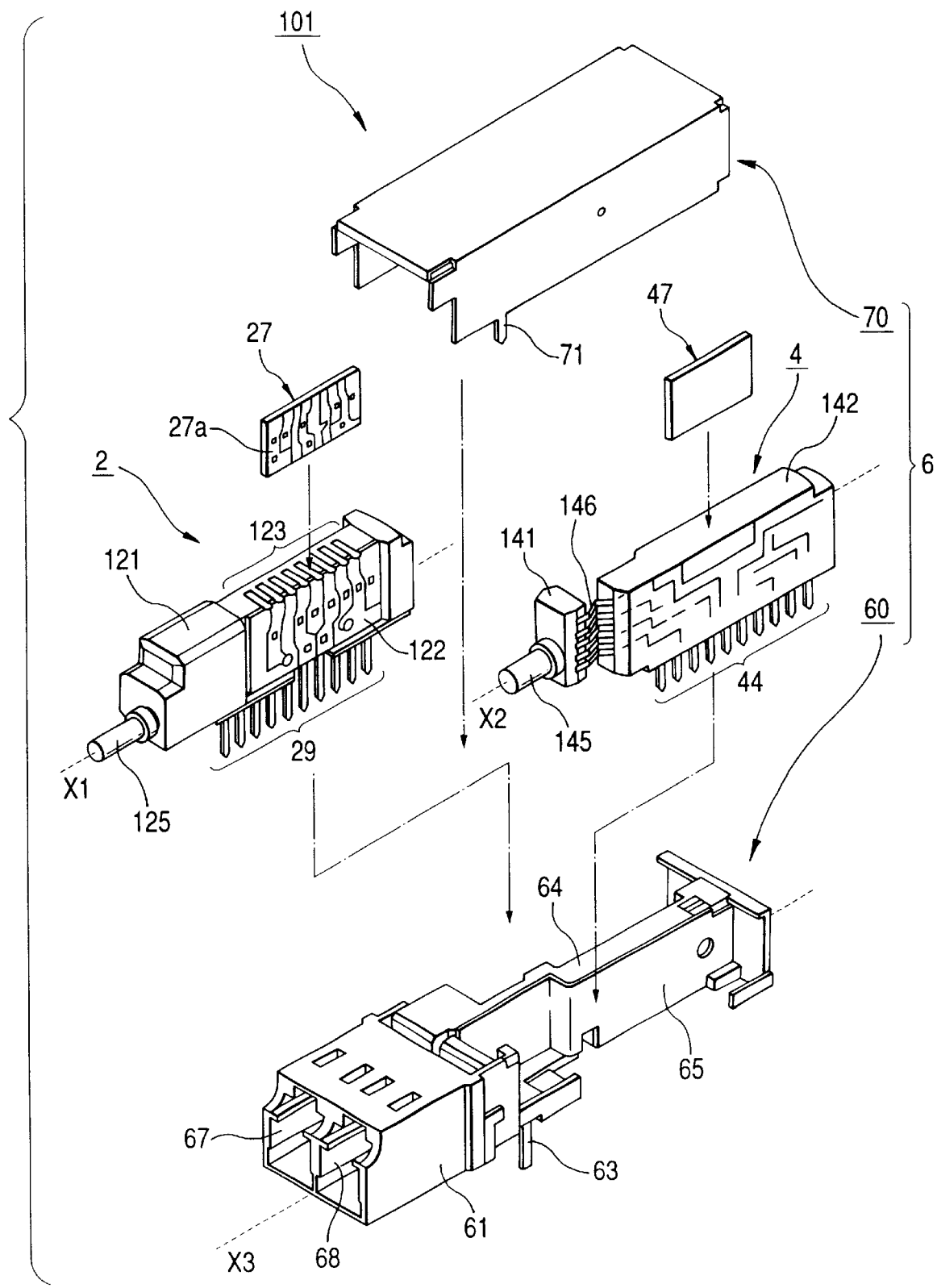
FIG. 9 is an exploded perspective view showing the optical transceiver according to the second embodiment.
Figure 10:
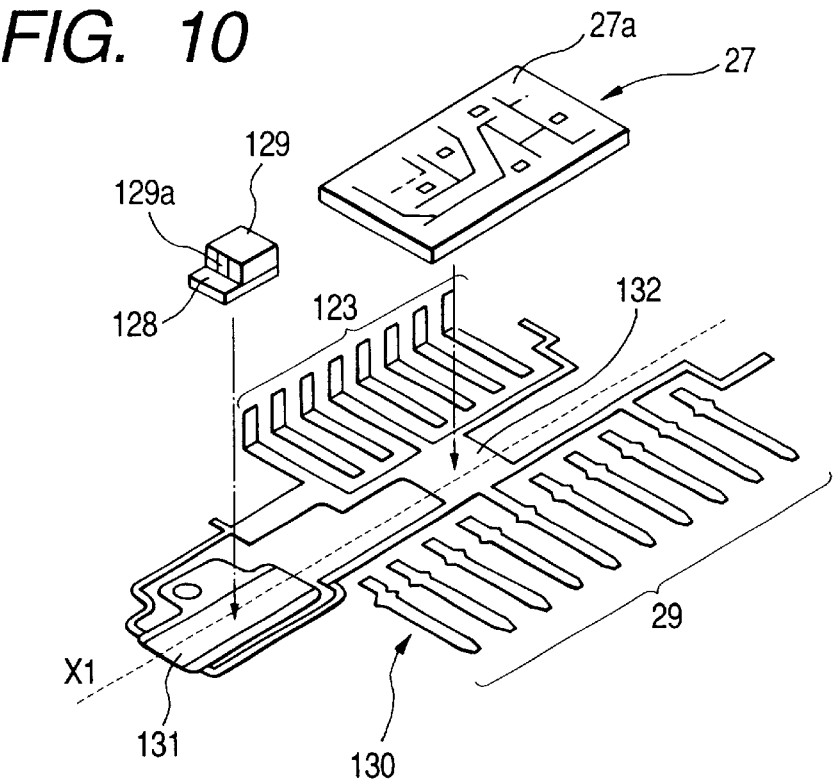
FIG. 10 is a partial exploded perspective view showing a transmitter optical assembly.
Figure 11:
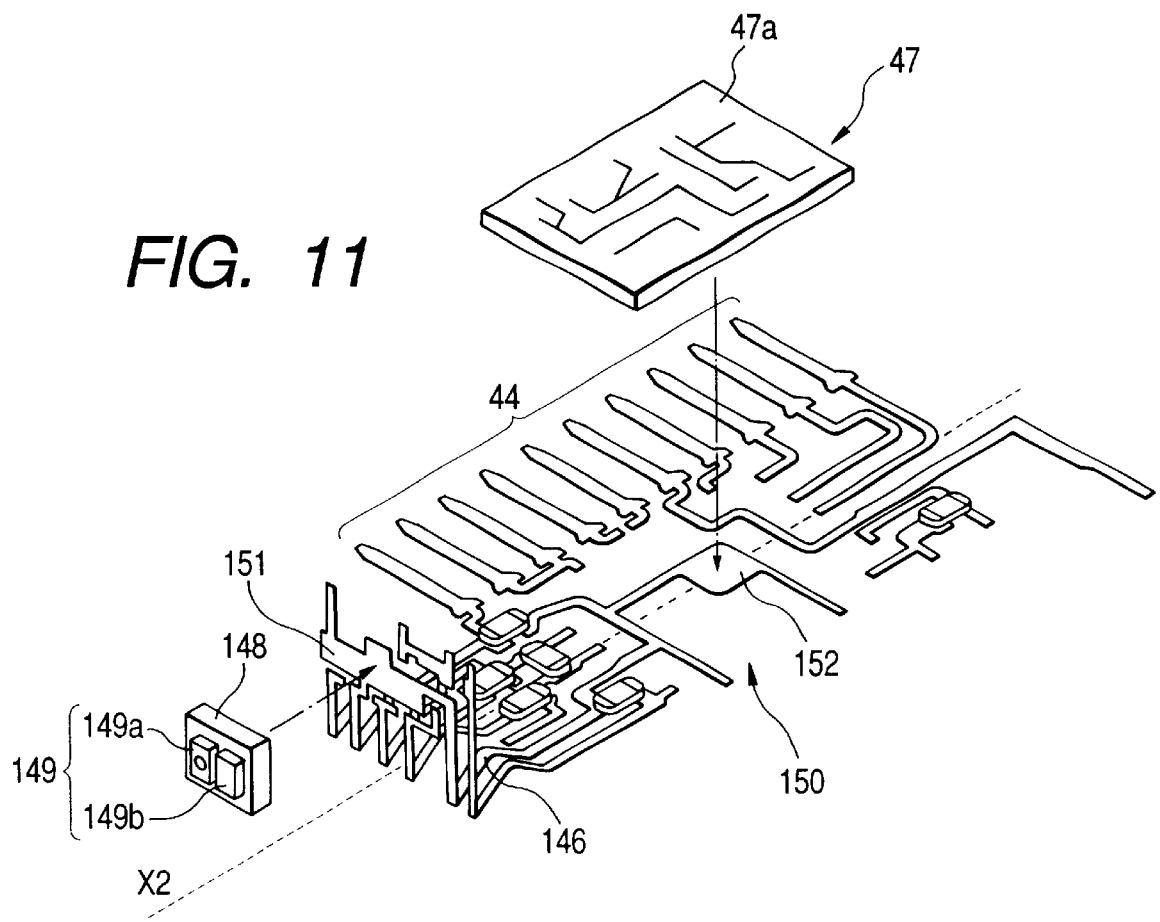
FIG. 11 is a partial exploded perspective view showing a receiver optical assembly.

FIG. 8 is a perspective view showing an optical transceiver 101 according to this embodiment. FIG. 9 is an exploded perspective view showing an optical transceiver 101 according to this embodiment. FIG. 10 is a partial exploded perspective view showing a transmitter optical assembly 2. FIG. 11 is a partial exploded perspective view showing a receiver optical assembly 4.

First, for the approximate shape of the optical transceiver 101 according to this embodiment, the optical transceiver 101 according to this embodiment has a substantially rectangular parallelepiped shape as shown in FIG. 8 and has a receptacle part 61 provided at one end and external lead pins 44 sticking out from the bottom surface in FIG. 8 (actually external lead pins 29 as shown in FIG. 9 stick out but are not shown in FIG. 8).

Next, parts configuring the optical transceiver 101 will be explained. As shown in FIG. 9, the optical transceiver 101 according to this embodiment includes a transmitter optical assembly 2 for transmitting an optical signal, a receiver optical assembly 4 for receiving an optical signal and a housing 6 to which these assemblies are attached (comprising a housing main body 60 and a cover 70).

The transmitter optical assembly 2 is composed of an resin molded electronic circuit 121, a sleeve 125, ten external lead pins 29, an auxiliary electronic circuit substrate 122 and eight lead pins 123. The resin molded electronic circuit 121 is in the shape of an approximately flat plate. The sleeve 125 is extended from one end of the resin molded electronic circuit 121 along its length direction (direction of the axis X1 in FIG. 9). The ten external lead pins 29 stick out from the resin molded electronic circuit 121 in the direction substantially perpendicular to the axis X1. The auxiliary electronic circuit substrate 122 is adhered to the side face of the resin molded electronic circuit 121 in substantially parallel to a transmitter electronic circuit substrate that will be described later. The auxiliary electronic circuit substrate 122 is mounted with an adjusted semi-fixed resistor. The eight lead pins 123 is bent approximately at a right angle in order to fix the auxiliary electronic circuit substrate 122 to the resin molded electronic circuit 121. The sleeve 125 has an inner diameter to allow a 1.25-mm-diameter ferrule to be inserted.

Next, the resin molded electronic circuit 121 will be explained referring to FIG. 10. FIG. 10 is an exploded perspective view of the inside of the resin molded electronic circuit 121. Unsupported lead pins 123 and 29 in FIG. 10 are fixed via soldering to a transmitter electronic circuit substrate 27 and supported by the resin composing the resin molded electronic circuit 121.

The resin molded electronic circuit 121 seals using resin a light emitting element 129, a chip carrier 128, a transmitter electronic circuit substrate 27 and a leadframe 130. The chip carrier 128 mounts the light emitting element 129. On the transmitter electronic circuit substrate 27 were formed an electronic circuit for processing an electric signals input to the light emitting element 129. The leadframe 130 is a transmitter base for installing these components. The light emitting element 129 is mounted on a light emitting element mounting portion 131 provided on the leadframe 130 via a chip carrier 128. On the light-emitting face 129$a$ of the light emitting element 129, the optical axis of emitted light is in the direction along the axis X1 and the light-emitting face 129$a$ and the sleeve 125 shown in FIG. 9 are connected via an optical waveguide (not shown). The light emitting element 129 may be an InGaAsP light emitting diode or an InGaAsP laser diode that outputs an optical signal in the 1.3 $\mu$m wavelength band. Electronic circuit components are mounted on the upper face 27$a$ of the transmitter electronic circuit substrate 27 mounted on a substrate mounting portion 132 provided on the leadframe 130 to form a specific wiring pattern (schematically shown in FIG. 10). The transmitter electronic circuit substrate 27 and the substrate mounting portion 132 are adhered via conductive adhesive or solder.

The aforementioned auxiliary electronic circuit substrate 122 (see FIG. 9) and the transmitter electronic circuit substrate 27 are connected via lead pins 123. This allows adjustment of the quantity of light output from the light emitting element 129 by the auxiliary electronic circuit substrate 122 even after the transmitter electronic circuit substrate 27 has been resin sealed.

Next, the receiver optical assembly 4 will be explained. The receiver optical assembly 4, as shown in FIG. 9, includes a resin molded light receiving device 141, a resin molded electronic circuit 142, a sleeve 145 and ten external lead pins 44. The resin molded light receiving device 141 has sealed a light receiving part 149 (see FIG. 1) composed of a light receiving element 149a and a preamplifier 149b. The resin molded electronic circuit 142 is in the shape of an approximately flat plate that has sealed a transmitter electronic circuit substrate 47. The sleeve 145 is extended from the resin molded electronic circuit 142 along its length direction (direction of the axis X2 in FIG. 9). The ten external lead pins 44 stick out from the resin molded electronic circuit 142 in the direction substantially perpendicular to the axis X2. The resin molded light receiving device 141 and the resin molded electronic circuit 142 are electrically and mechanically connected via hooked lead pins 146. The sleeve 145 has an inner diameter equivalent to that of the sleeve 125 provided in the transmitter optical assembly 2.

Next, the resin molded light receiving device 141 and the resin molded electronic circuit 142 (hereinafter the resin molded light receiving device 141 and the resin molded electronic circuit 142 are referred to as the "resin molded portion") will be explained referring to FIG. 11. FIG. 11 is an exploded perspective view of the inside of the resin molded portion. Unsupported lead pins 44 in FIG. 11 are fixed via soldering to the transmitter electronic circuit substrate 47 and supported by the resin composing the resin molded portion.

The resin molded portion of the receiver optical assembly 4 seals the light receiving element 149a, the preamplifier 149b, a chip carrier 148, the receiver electronic circuit substrate 47 and a leadframe 150. The chip carrier 148 mounts the light receiving element 149a and the preamplifier 149b. On the receiver electronic circuit substrate 47 is formed an electronic circuit for processing an electric signal output from the preamplifier 149b. The leadframe 150 is a transmitter base for installing these components. As understood from FIG. 1, components inside the resin molded light receiving device 141 and the resin molded electronic circuit 142 are all mounted on a leadframe 150. Thus part of the leadframe 150 is bent so that the light-intercepting face of the light receiving element 149a is faced in the direction perpendicular to the axis X2. The bent parts are internal lead pins 146 in FIG. 9. The light receiving element 149a is mounted on a light receiving element mounting portion 151 provided on the leadframe 150 via the chip carrier 148. Since the light receiving part 149 is mounted on the light receiving element mounting portion 151, the optical axis of light to be detected by the light receiving element 149a is in the direction along the axis X2. The light receiving element 149a may be an InGaAs-PIN photodiode that has a sensitivity to an optical signal in the 1.3 μm wavelength band. The resin molded light receiving device 141 is formed of a resin transparent to light in the 1.3 μm wavelength band that is a detected wavelength of the light receiving element 149a. Electronic circuit components such as IC are mounted on the upper face 47a of the receiver electronic circuit substrate 47 mounted on the substrate mounting portion 152 provided on the leadframe 150 to form a specific wiring pattern (schematically shown in FIG. 11). The receiver electronic circuit substrate 47 and the substrate mounting portion 152 are adhered via conductive adhesive or solder.

Description follows referring to FIGS. 8 and 9 again. The housing 6 with which an optical connector is engaged. The housing 6 has the housing main body 60 with the receptacle part provided on one side, and the cover 70 for covering the transmitter optical assembly 2 and the receiver optical assembly 4. The housing 6 is in the shape of a substantially rectangular parallelepiped with the cover 70 coupled with the housing main body 60. The housing main body 60 is formed of an insulating plastic resin and the cover 70 is formed of a metal. The receptacle part 61 has through holes 67 and 68 that penetrate the housing 6 from the innermost part to the outermost part in the direction parallel to the axis X3 shown in FIG. 9. The shape of the through holes 67 and 68 at the outermost part side of the housing 6 is designed to be engaged with optical connector. The shape of the through holes 67 and 68 at the innermost part side of the housing 6 is designed to receive sleeves 125, 145 respectively provided on the transmitter optical assembly 2 and the receiver optical assembly 4. At the lower part of the housing main body 60 in the proximity of the receptacle part 61 are provided two stud pins 63 (only one of them is shown) for fixing the optical transceiver 101 to a circuit substrate (not shown). The stud pins 63 will be described later.

In the transmitter optical assembly 2 and the receiver optical assembly 4, the face 27a of the transmitter electronic circuit substrate 27 and the face 47a of the receiver electronic circuit substrate 47 are arranged in opposed positions in order to reduce spacing between the sleeve 125 provided on the transmitter optical assembly 2 and the sleeve 145 provided on the receiver optical assembly 4. More particularly, a surface of the transmitter electronic circuit substrate 27 where the electronic circuit is formed is substantially parallel to a surface of the receiver electronic circuit substrate 47 where the electronic circuit is formed in their longitudinal direction. While the transmitter electronic circuit substrate 27 and the receiver electronic circuit substrate 47 are shown separately from the resin 121 and 142 to which the circuit substrates are sealed in FIG. 9, the circuit substrates are sealed to the resin molded electronic circuit 121 and the resin molded electronic circuit 142 in the shown direction. The sleeves 125, 145 are inserted from the inner part of the housing 6 into the receptacle part 61. External lead pins 29, 44 stick out outside the housing 6 from an opening formed in the bottom of the housing main body 60. The center spacing between the sleeves 125 and 145 in the optical transceiver 101 according to this embodiment is 6.25 mm.

Between the transmitter optical assembly 2 and the receiver optical assembly 4 arranged as mentioned earlier, a partition wall 64 that is a part of the housing main body 60 is formed as shown in FIG. 9. On the side of the partition wall on which the receiver optical assembly 4 is attached is fixed a metal shield 65 composed of a thin metal plate along the partition wall 64. As shown in FIG. 9, the metal cover 70 for covering the transmitter optical assembly 2 and the receiver optical assembly 4 has a grounding terminal 71 to play the role of an electromagnetic shield.

As mentioned earlier, the transmitter optical assembly 2 and the receiver optical assembly 4 are attached to the housing main body 60. In this state, the cover 70 is closed to cover the transmitter optical assembly 2 and the receiver optical assembly 4 to configure the optical transceiver 101 according to this embodiment as shown in FIG. 8.

Next, the operation of the optical transceiver 101 according to this embodiment will be described. The optical transceiver 101 according to this embodiment is used for an interface part that transmits/receives an optical signal passing through an optical fiber in an optical communications system such as an optical LAN. That is, in the optical transceiver 101, the receptacle part 61 is engaged with an optical connector accommodating an optical fiber, and lead pins 29 and 44 sticking out from the bottom of the optical transceiver 101 are electrically connected to a circuit substrate that mounts the optical transceiver 101.

An optical signal passing through the optical fiber is received and converted to an electric signal by the receiver optical assembly 4 and the resulting electric signal is transmitted to the circuit substrate to which the optical transceiver 101 is connected, via lead pins 44 of the receiver optical assembly 4 of the optical transceiver 101. The electrical signal transmitted via lead pins of the transmitter optical assembly 2 is converted to an optical signal by the transmitter optical assembly 2 and the resulting optical signal is transmitted to the optical fiber via an optical connector engaged with the receptacle part 61.

In the transmitter optical assembly 2 and the receiver optical assembly 4 of the optical transceiver 101 according to this embodiment, electric circuit substrates 27 and 47 in the respective assemblies are arranged in opposed positions. In the transmitter optical assembly 2, the sleeve 125, the light emitting element 129, and the transmitter electronic circuit substrate 27 are arranged on the axis X1. In the receiver optical assembly 4, the sleeve 145, the light receiving element 149a, and the receiver electronic circuit substrate 47 are arranged on the axis X2. Thus, by opposing the electric circuit substrate 27 to the electric circuit substrate 47 in the respective assemblies, it is possible to reduce spacing between the sleeve 125 and 145. Via this procedure, it is possible to reduce spacing between the through hole 67 provided in the receptacle part 61 for inserting the sleeve 125 of the transmitter optical assembly 2 and the through hole 68 for inserting the sleeve 145 of the receiver optical assembly 4. Providing a sleeve center spacing of 6.25 mm and the inner diameter of the sleeve to accommodate 1.25-mm-diameter ferrule as shown in the optical transceiver 101 according to the embodiment can realize an optical transceiver 101 that can be engaged with an LC connector currently in widespread use.

In the optical transceiver 101 according to this embodiment, the metal shield 65 is provided between the transmitter optical assembly 2 and the receiver optical assembly 4. This reduces the effects of an electromagnetic noise, which is generated in the receiver optical assembly 4 when an optical signal is converted to an electric signal, in the transmitter optical assembly 2. This also reduces the effects of an electromagnetic noise, which is generated in the transmitter optical assembly 2 when an electric signal is converted to an optical signal, in the receiver optical assembly 4. This is especially effective because in case electronic circuit substrates 27 and 47 in each of the transmitter optical assembly 2 and the receiver optical assembly 4 are arranged in opposed positions and positioned in close proximity, the effects of an electromagnetic noise is expected to be greater, as in the optical transceiver 101 according to this embodiment.

In the optical transceiver 101 according to this embodiment, the cover 70 for covering the transmitter optical assembly 2 and the receiver optical assembly 4 is formed of a metal and has the grounding terminal 71. Thus, compared with a case where the housing 6 is composed of plastics alone, the effects of an external electromagnetic noise on the transmitter optical assembly 2 and the receiver optical assembly 4 can be reduced. The need for using a TO semiconductor package utilized in the related art to protect a light emitting element and a light receiving element from an external electromagnetic noise is eliminated. Spacing between the light emitting element and the light receiving element is no longer dependent on the size of this semiconductor package.

While a transparent resin is used for molding the receiver electronic circuit substrate 47 composing the receiver optical assembly 4, an opaque resin such as a black resin may be used. In case the receiver electronic circuit substrate 47 is molded with a transparent resin, it is possible to mold the receiver electronic circuit substrate 47 and the light receiving element to be molded with a transparent resin at the same time. The black resin is better than the transparent resin in terms of resistance to humidity and more reliable in terms of change in temperature.

It is of course possible to change the inner diameter and center spacing of a sleeve.

(Third Embodiment)

Figure 12:
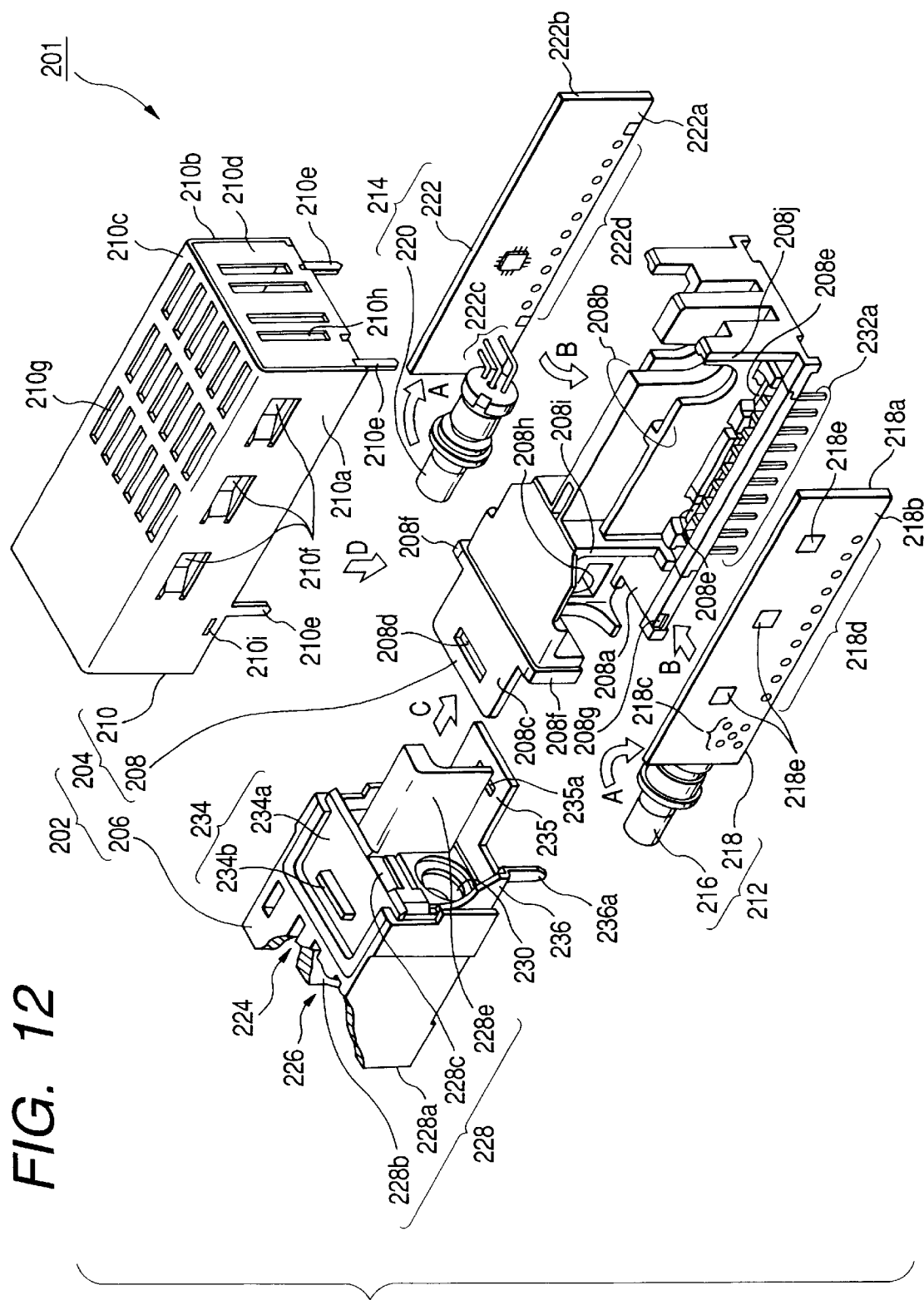
FIG. 12 shows main components composing an optical transceiver according to the third embodiment.
Figure 13:
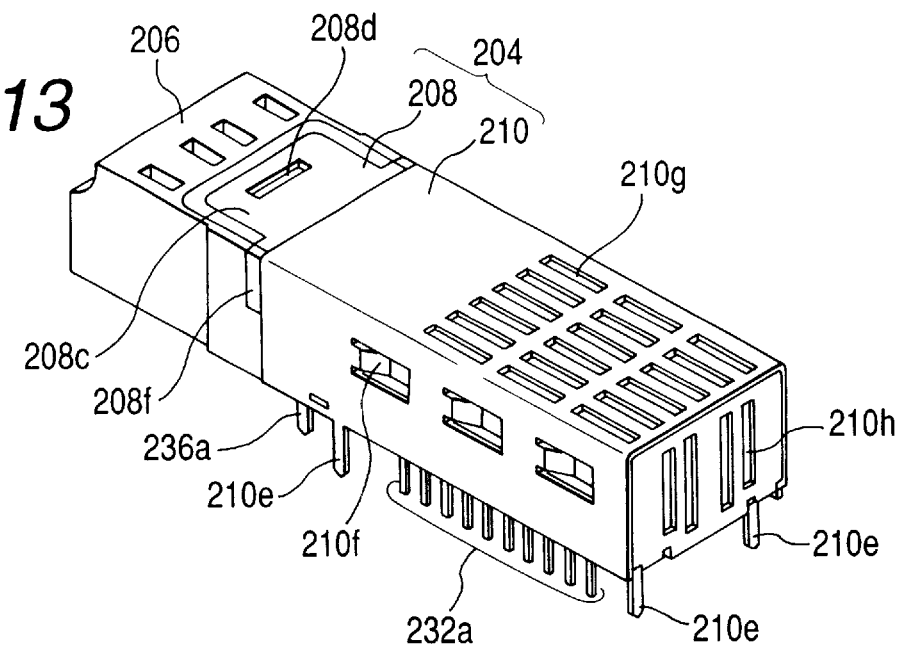
FIG. 13 shows the optical transceiver according to the third embodiment.
Figure 14:
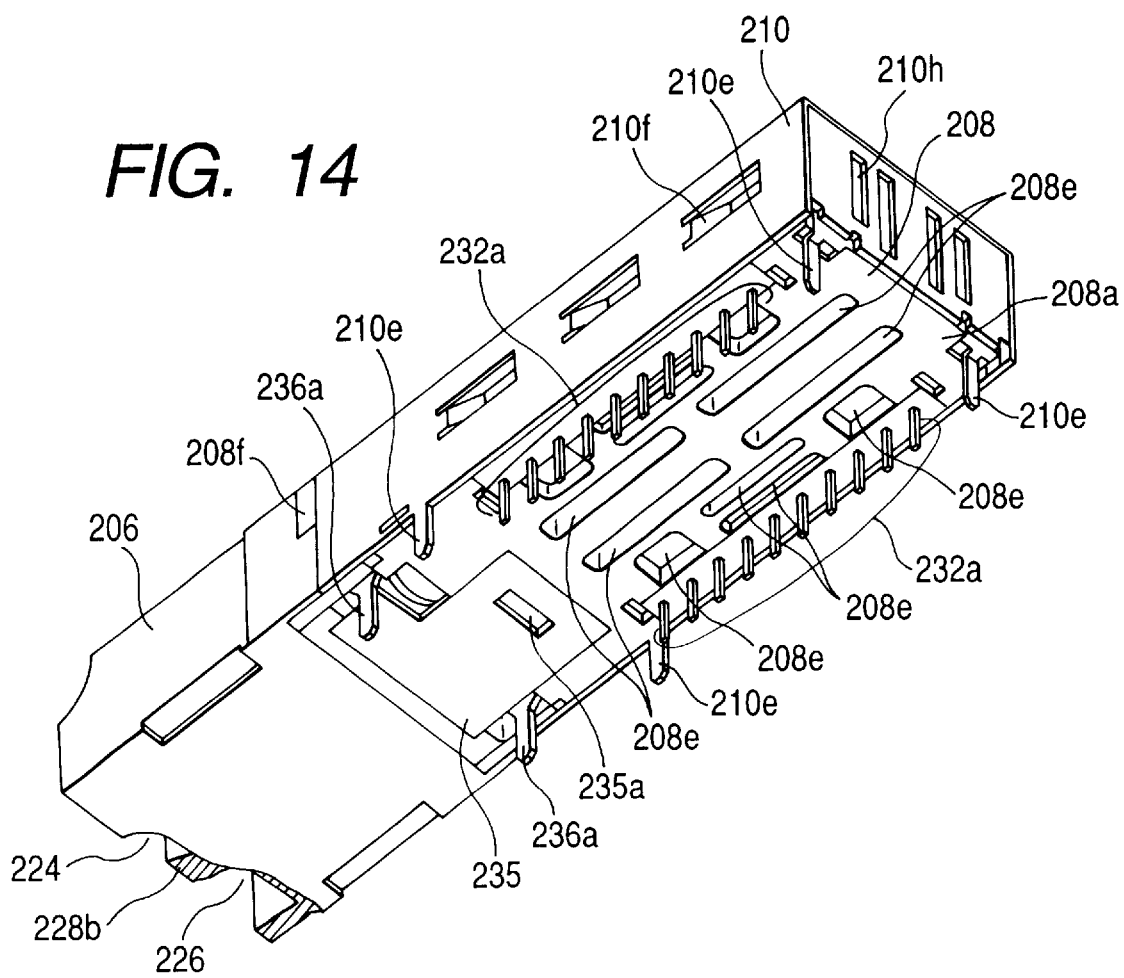
FIG. 14 shows the optical transceiver according to the third embodiment.
Figure 15A:
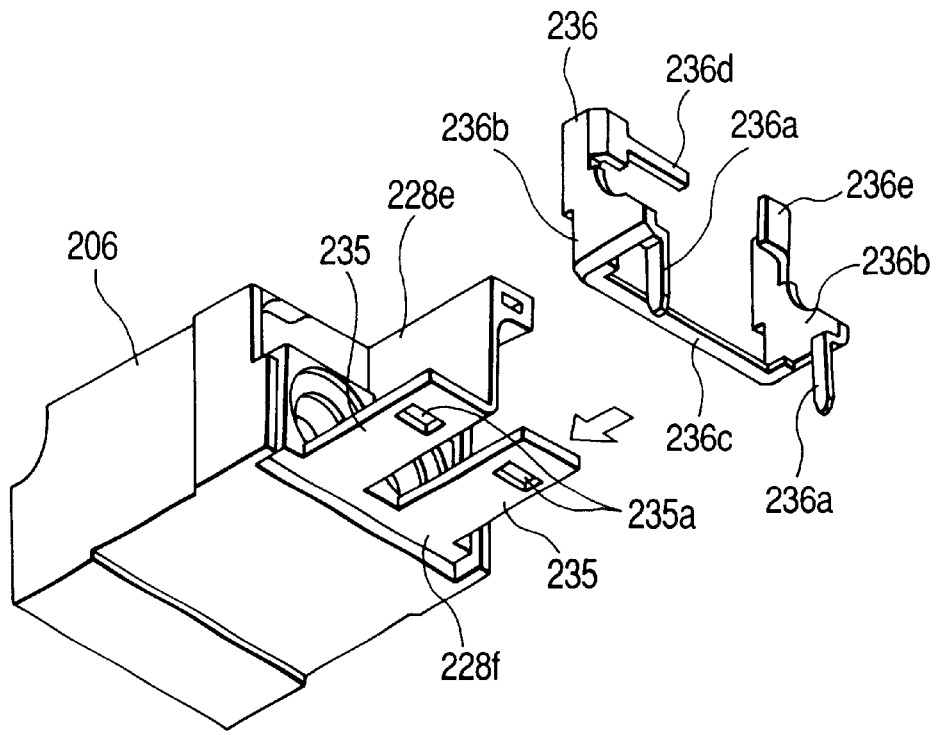
FIGS. 15A–15D respectively show connecting members and receptacle members.
Figure 15B:
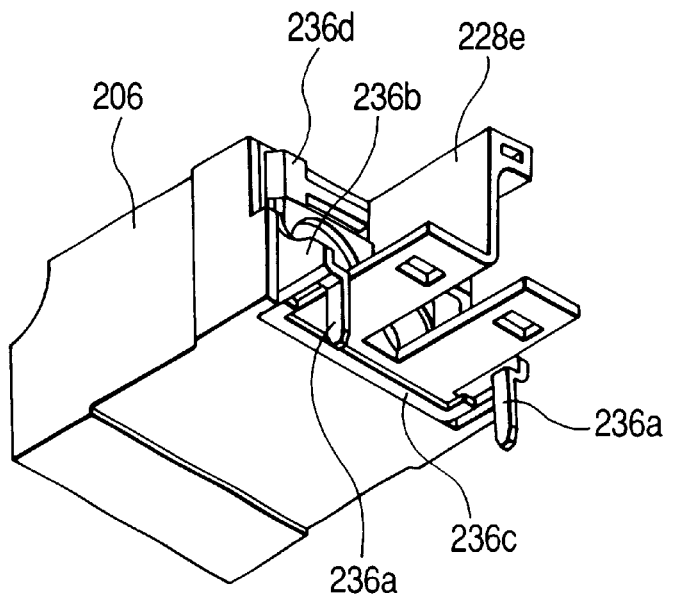
Figure 15C:
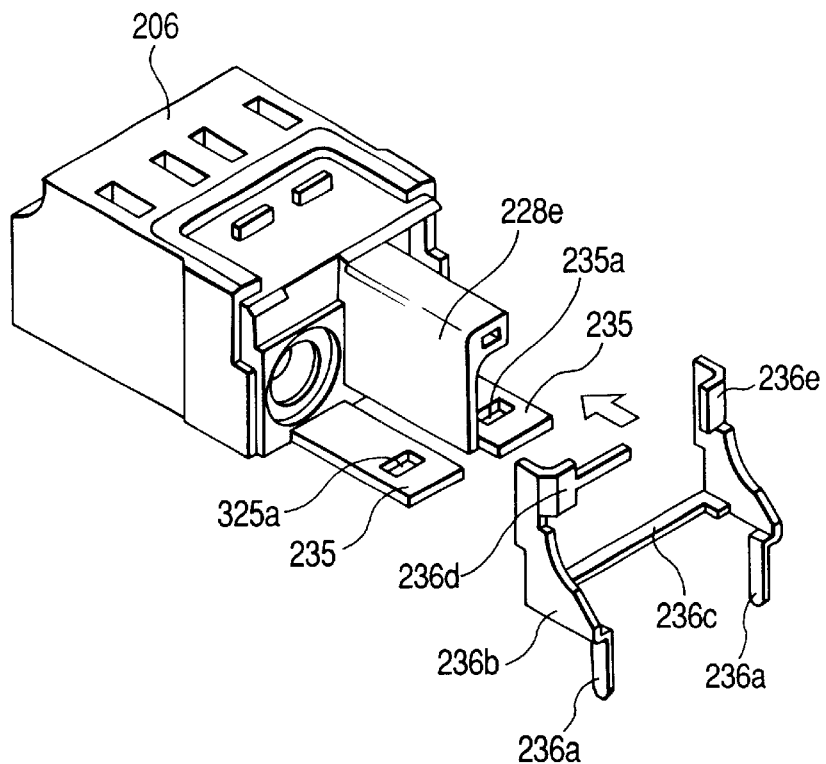
Figure 15D:
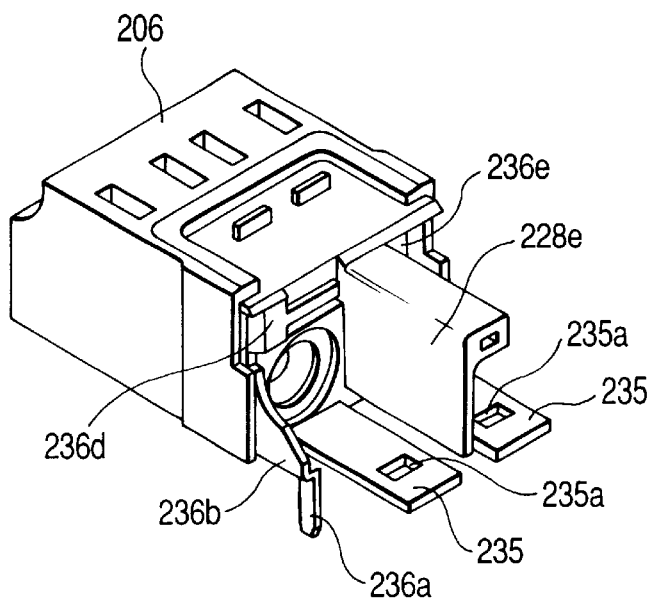

An optical transceiver according to the third embodiment of the invention will be explained. FIGS. 12–14 show an optical transceiver 201 according to the third embodiment of the invention.

The optical transceiver 201 comprise a housing 202, a first opto-electrical conversion device 212, and a second opto-electrical conversion device 214. The housing 202 can comprise an accommodating member 204 and a receptacle member 206. By the accommodating member 204 the first and the second opto-electrical conversion devices 212, 214 are supported. The receptacle member 206 is equipped with receptacles 224 and 226 that extend along a predetermined axis. The receptacles 224 and 226 are provided to receive an optical connector (for example 252 in FIG. 17). The accommodating member 204 has a mounting member 208 and a covering member 210. The covering member 210 is installed to sandwich the opto-electrical conversion devices 212 and 214 against the mounting member 208.

The housing 202, that is, the receptacle member 206, the mounting member 208 and the covering member 210 defines an accommodation space for accommodating the opto-electrical conversion devices 212 and 214 so that the opto-electrical conversion devices 212 and 214 may be optically connected to the optical connector at receptacles 224 and 226.

The receptacle member 206 has an outer wall 228a and a partition wall 228b provided along the predetermined axis in order to define the receptacles 224 and 226. The partition wall 228b is provided to form the receptacles 224 and 226 in cooperation with the outer wall 228a. Each of the receptacles 224 and 226 has a guide hole 230 that extends along the predetermined axis in the bottom 228c. Guide holes 230 guide the opto-electrical conversion devices 212 and 214 so that the heads of the opto-electrical conversion devices 212 and 214 stick out to the receptacles 224, 226. Material of the receptacle member 206 is preferably formed of a synthetic resin such as liquid crystal polymer that is easier to form a minute shape. On the receptacle member 206 a conductive member can be provided for enabling electrical shielding. The receptacle member 206 is preferably coated with a conductive film such as a plate film. Preferably the surface of the receptacle member 206 is covered with a conductive material all over. The receptacle member 206 can be formed of a metallic material.

The receptacle member 206 can comprise a wall 228e provided between the heads of the opto-electrical conversion devices 212 and 214 inserted into respective guide holes 230. The wall 228e is effective for electrically shielding between the opto-electrical conversion devices 212 and 214.

The receptacle member 206 can comprise a concave part 234a on one face of the outer wall. The concave part 234a can comprise a first engaging part 234b for latching. The first engaging part includes at least for example either a hole or a convex. The first engaging part 234b can be used when the receptacle member 206 is engaged with and fixed to the mounting member 208.

The receptacle member 206 further has a protective part 235 for protecting the opto-electrical conversion devices 212 and 214 inserted into guide holes 230. The protective part 235 extends along a predetermined reference plane and has a second engaging part 235a for latching. The second engaging part includes at least for example either a hole or a convex. The second engaging part is an engaging hole in this embodiment although this is not intended to limit the invention. The protective part 235 is guided to a guide concave part provided on the outer wall of the mounting portion 208a of the mounting member 208. The engaging part 235a is engaged with an engaging part provided on the outer wall of the mounting portion 208a of the mounting member 208. This engaging part includes at least for example either a hole or a convex.

The mounting member 208 has a mounting portion 208a that extends along the predetermined reference plane. The mounting portion 208a has a series of terminal pins 232a to enable electrical connection of the opto-electrical conversion devices 212 and 214. The terminal pins 232a are provided on the bottom (reference mounting surface) of the mounting portion 208a opposed to the mounting substrate (not shown) and bent at a predetermined position from the mounting surface of the mounting portion 208a. The terminal pins 232a are arranged along the arrangement direction of wiring substrates 218 and 222. In this embodiment, the terminal pins 232a are provided along a predetermined axis.

The mounting member 208 can comprise a wall 208b that extends along the plane crossing the predetermined reference plane. The wall 208b is provided on the mounting surface. The wall 208b is provided to isolate the accommodating spaces of the opto-electrical conversion devices 212 and 214. Thus, providing a conductive member (not shown) along the wall 208b is effective for reducing the electrical effects between the opto-electrical conversion devices 212 and 214.

The mounting member 208 has a latch part 208c supported at one end of the wall 208b. The latch part 208c is provided with a latch tab that extends along the predetermined reference plane. The latch tab can comprise an engaging part 208d to be engaged with the engaging part 234b for latching of the receptacle member 206. The engaging part 208d is at least either an engaging hole or an engaging convex. The concave part 234a of the receptacle member 206 serves to guide the latch tab.

Each of the first and the second opto-electrical conversion devices 212 and 214 can convert one of the optical signal and the electric signal to the other. These devices include a semiconductor light receiving device for converting an optical signal to an electric signal and a semiconductor light emitting device for converting an electric signal to an optical signal. The semiconductor light receiving device can include an opto-electrical conversion element and a first wiring substrate which are arranged in the predetermined axis. The semiconductor light emitting device can include an electro-optical conversion element and a second wiring substrate which are arranged in the predetermined axis.

Wiring substrates 218 and 222 comprise component mounting surfaces 218a and 222a and corresponding opposed surfaces 218b and 222b. The component mounting surfaces 218a and 222a and corresponding opposed surfaces 218b and 222b extend along the predetermined axis. The corresponding opposed surfaces 218b and 222b can comprise a conductive layer substantially all over its surface. The conductive layer is preferably connected to a reference potential line. The component mounting surfaces 218a and 222a are provided with a wiring layer to allow electrical connection between mounted components. The wiring substrates 218 and 222 comprise first holes 218c and 222c, and second holes 218d and 222d. The connecting pin of the opto-electrical conversion element or the electro-optical conversion element (250 in FIG. 16 (a) and FIG. 16 (b)) is inserted into the first holes 218c and 222c. The lead terminals 232a provided on the accommodating member 204 is inserted into the second holes 218d and 222d. The first holes 218c and 222c and the second holes 218d and 222d penetrate from one end to the other of the component mounting surface and the opposed surface. The first holes 218c and 222c are provided on one end portion of the wiring substrates 218 and 222 that extends along the predetermined axis. The second holes 218d and 222d are provided on one end of the wiring substrates 218d and 222d that extends along the predetermined axis.

The wiring substrates 218 and 222 are preferably arranged so that the component mounting surfaces 218a and 222a may be opposed to the side face of the wall 208b. Via this configuration, a radiated noise from the components on the component mounting surfaces 218a and 222a is reduced by the conductive layer of the opposed surfaces 218b and 222b. The wiring substrates 218 and 222 are arranged in parallel while sandwiching the wall 208b. This is realized by the support via the terminal pin 232a provided on the mounting member 208 and the sandwich by a conductive tab 210f and supports 208h, 208i, and 208j of the mounting member 208 by way of the elastic force of the conductive tab 210f of the covering member 210. The terminal pin 232a is connected to the conductive layer of the wiring substrates 218 and 222 and thus can be used for connecting the conductive layer of the wiring substrates 218, 222 to the reference potential line.

The covering member 210 sandwiches the first and the second opto-electrical conversion devices 212 and 214, together with the mounting member 208. The covering member 210 is preferably formed of a conductive material or can comprise a conductive material at least on the surface. Thus, the covering member 210 serves to electrically shield the first and the second opto-electrical conversion devices 212 and 214.

The covering member 210 comprises side faces 210a and 210b, a lid 210c, and a rear face 210d. The side faces 210a and 210b extend along the wall 208b of the mounting member 208 and sandwiches the wiring substrates 218 and 222 of the opto-electrical conversion devices 212 and 214. The side faces 210a and 210b can be arranged to face the opposed surfaces 218b and 222b of the wiring substrates 218 and 222. The lid 210c is opposed to the mounting portion 208a and connected to the side faces 210a and 210b on the sides of the lid 210c that are opposed to each other. The rear face 210d is adjacent to the side faces 210a and 210b and the lid 210c and crosses the predetermined axis along the direction the receptacles 224 and 226 extend. The covering member 210 can comprise a connection terminal 210e provided on either of the side faces 210a and 210b and the rear face 210d. The connection terminal 210e is provided so that the connection terminal 210e may be connected to the reference potential line of the mounting substrate when the optical transceiver 201 is mounted on the mounting substrate. Thus, the reference potential is given to the covering member 210 thereby assuring electrical shielding characteristics. The connection terminal 210e sticks out from the substrate mounting face.

The side faces 210a and 210b is provided with one or more conductive tabs 210f. The conductive tab 210 is bent from a plane including the side face to an accommodating space. The bending allows the conductive tab 210f to come in contact with the opposed surfaces 218b and 222b of the wiring substrates 218 and 222. Via this contact, the conductive layer on the opposed surfaces 218b and 222b of the wiring substrates 218 and 222 and the covering member 210 are electrically connected.

The lid 210c is provided with one or more openings 210g. The opening 210g preferably has a shape that extends in the direction along the predetermined axis. The rear face 210d is provided with one or more openings 210h. The opening 210h preferably has a shape that extends in the direction from the lid 210c to the mounting member 208. Referring to FIG. 14, the mounting portion 208a is provided with one or more openings 208e. The opening 208e extends along the direction the wiring substrates 218 and 222 are arranged.

The covering member 210 can comprise terminals for connecting to the ground potential lines of the wiring substrates 218 and 222. The wiring substrates 218 and 222 can comprise connecting electrodes for this purpose. This allows the covering member 210 to be electrically connected to a signal ground line in the optical transceiver 201.

Referring to FIG. 15A through FIG. 15D, the optical transceiver 201 comprises a terminal member 236. The terminal member 236 has conductivity and preferably formed of a conductive material including a metal (for example a phosphor bronze). This provides a predetermined mechanical strength while assuring electrical connection.

The terminal member 236 comprises a pair of connecting terminal 236a, a pair or side faces 236b, a bridge 236c, and a fixing parts 236d, 236e. The terminal member 236 is arranged to come in contact along the external face of the bottom 228c of the receptacles 224 and 226. Thus the terminal member 236 is used to connect the receptacle member 206 to the reference potential line of the mounting substrate. Accordingly, the terminal member 236 comprises one or more connection terminals 236a that extends in the direction along the terminal pin 232a. The terminal pin 236a is called a stud pin. The terminal member 236 according to this embodiment has the bridge 236c that connects the pair of terminals 236a via the bottom of the receptacle member 206. The bridge 236c is accommodated in the concave part 228f provided at the bottom of the receptacle member 206.

The terminal member 236 has the pair of side faces 236b that have contact faces to come in contact with the enclosure of the guide hole 230. The pair of contact faces are opposed to each other and sandwiches the enclosure of the guide hole 230 from both sides. The side faces 236b are connected to the bridge 236c at one end and extends in the direction crossing the bridge 236c. The side faces 236b are provided to connect a pair of connecting terminals 236a. Providing the side faces 236b allows spacing between the bridge 236c and the connecting terminal 236a. This makes it possible to determine the position of the connecting terminal 236a independently of the bridge 236c within a certain range. It is also possible to determine the position where the connecting terminal 236a is arranged without limiting the shape of the receptacle member 206. The terminal member 236 further comprises fixing parts 236d and 236e. The fixing parts 236d and 236e are provided on the other faces of a pair of side faces 236b. Each of the fixing parts 236d and 236e has a fixing tab that extends from one side to the other side. One side of the fixing tab comes in contact with the frame of the guide hole 230. The fixing tab, together with the bridge 236c, sandwiches the enclosure of the guide hole 230 from both sides.

On the terminal member 236, the bridge 236c is accommodated in the concave part 228f and the side faces 236d and 236e are engaged with the enclosure groove of the guide hole 230. One side of the fixing parts 236d and 236e comes in contact with the enclosure of the guide hole thereby supported by the receptacle member 206.

Referring to FIGS. 13 and 14 again, an optical transceiver 201 completed with sections shown in FIG. 12 assembled is shown. The following gives a general procedure necessary for obtaining such an optical transceiver 201. First assemble a semiconductor light receiving device and a semiconductor light emitting device 212 and 214. For this assembly work, fix an opto-electrical conversion element to the first wiring substrate and an electro-optical conversion element to the second wiring substrate (arrow A in FIG. 12). Next apply plate on the receptacle member 206 and the terminal member 236 and assemble the receptacle member 206 and the terminal member 236. Attach the semiconductor light receiving device 212 and the semiconductor light emitting device 214 to the mounting member 208 (arrow B in FIG. 12). Then engage mounting member 208 where these devices are attached to the receptacle member 206 (arrow C in FIG. 12). After that, engage the covering member 210 with the receptacle member 206 and the mounting member 208 (arrow D in FIG. 12). This engagement can be made using the engaging part 208g (for example one of a concave part or a convex part) of the mounting member 208 and the engaging part 210i (for example the other of a concave part or a convex part) of the covering member 210.

In a preferable embodiment, the receptacle member 206 comprises the plate film on its surface and the covering member 210 is formed of a metal. The plate film serves as a first shield member for electrically shielding the receptacles 224 and 226. The metal covering member 210 serves as a second shield member for electrically shielding the opto-electrical conversion device. In such an embodiment, the mounting member 208 is formed of an isolating material. The mounting member 208, in the assembled optical transceiver 201, has an insulating convex 208f for electrically insulating the plate film of the receptacle member 206 from the metal covering member 210. Thus the mounting member 208 also serves as an insulating material. That is, the first and the second shield members are electrically isolated from the other via the mounting member 208. This electrical isolation reduces the electromagnetic effects on the first shield member directly propagated to the second shield member for electrically shielding the opto-electrical conversion devices 224 and 226.

Figure 16A:
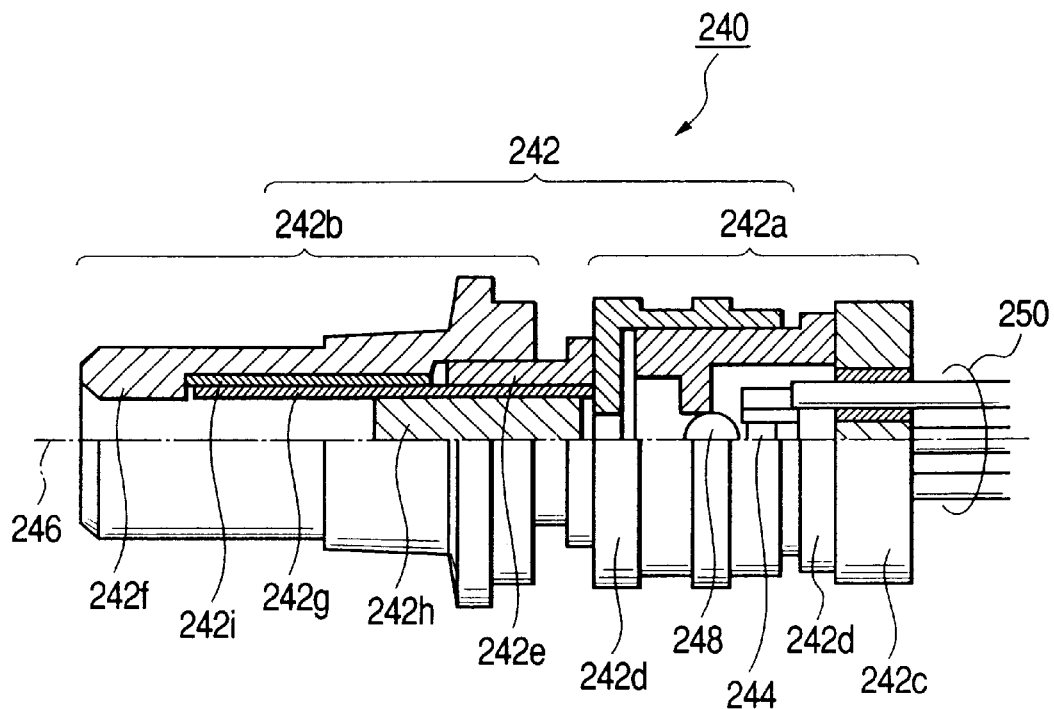
Figure 16B:
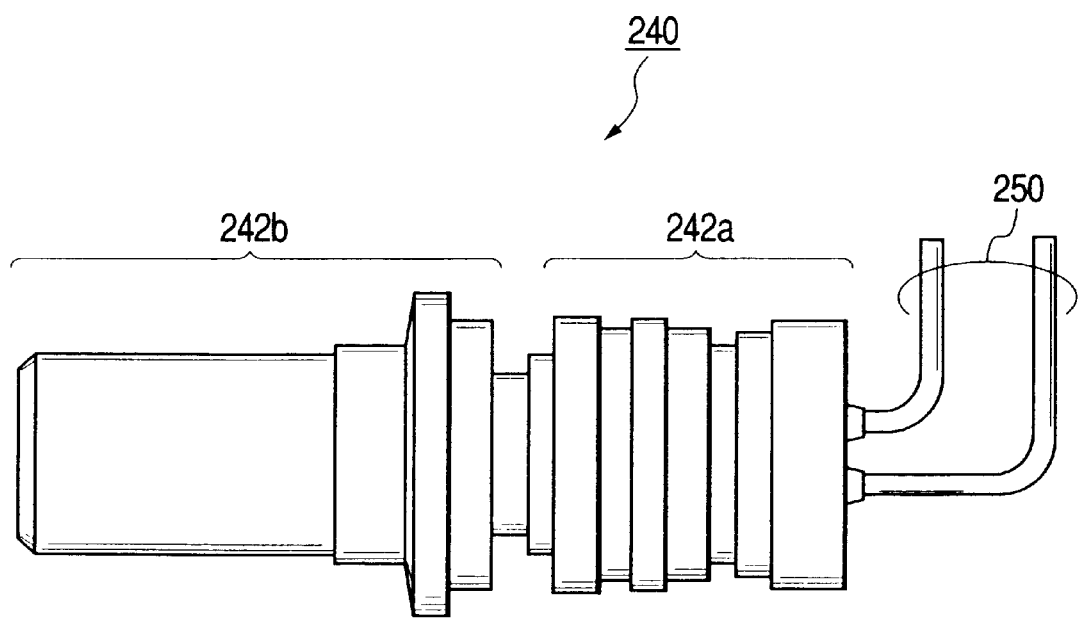

Referring to FIG. 16A and FIG. 16B, an opto-electrical conversion element and an electro-optical conversion element 240 are shown. The opto-electrical conversion element 244 is a semiconductor light receiving element such as a photodiode (pin photodiode or an avalanche photodiode). The electro-optical conversion element 244 is a semiconductor light emitting element such as alight emitting diode and a semiconductor laser.

The opto-electrical conversion element and the electro-optical conversion element 244 can be accommodated in a container 242 such as a package. The container 242 has an element accommodating part 242a and a guide part 242b.

In the element accommodating part of the container 242, the opto-electrical conversion element and the electro-optical conversion element 244 are hermetically sealed. The element accommodation part 242a has a base 242c formed of a metallic material such as a Kovar. On the base 242c a lens cap 242d formed of a metallic material such as a stainless steel is mounted. On the element accommodating part 242a a window 248 fixed to the lens cap 242d. The window 248 allows light related to the opto-electrical conversion element and the electro-optical conversion element 244 to pass and can comprise a condensing lens. The lens cap 242d is inserted into a base 242c formed of a metallic material such as a stainless steel. The base 242c can comprise a connecting pin 250 for performing electrical connection of the opto-electrical conversion element and the electro-optical conversion element 244. The container 242 is fixed to the wiring substrates 218 and 222 via the connecting pin 250. The connecting pin 250 is bent so that the optical axis 246 of the element 244 may be along a predetermined axis.

The guide part 242b has a guide member 242e formed of a metallic material such as a stainless steel. The guide member 242e is fixed to a holder 242d. Outside the guide member 242e is arranged a sleeve 242f formed of a metallic material such as a stainless steel. In the guide member 242e is accommodated a split sleeve 242g formed of a material such as zirconia. The split sleeve 242g positions the stub 242h in which an optical fiber is accommodated. The split sleeve 242g is fixed to the sleeve 242f via a fixing member 242i.

Figure 17:
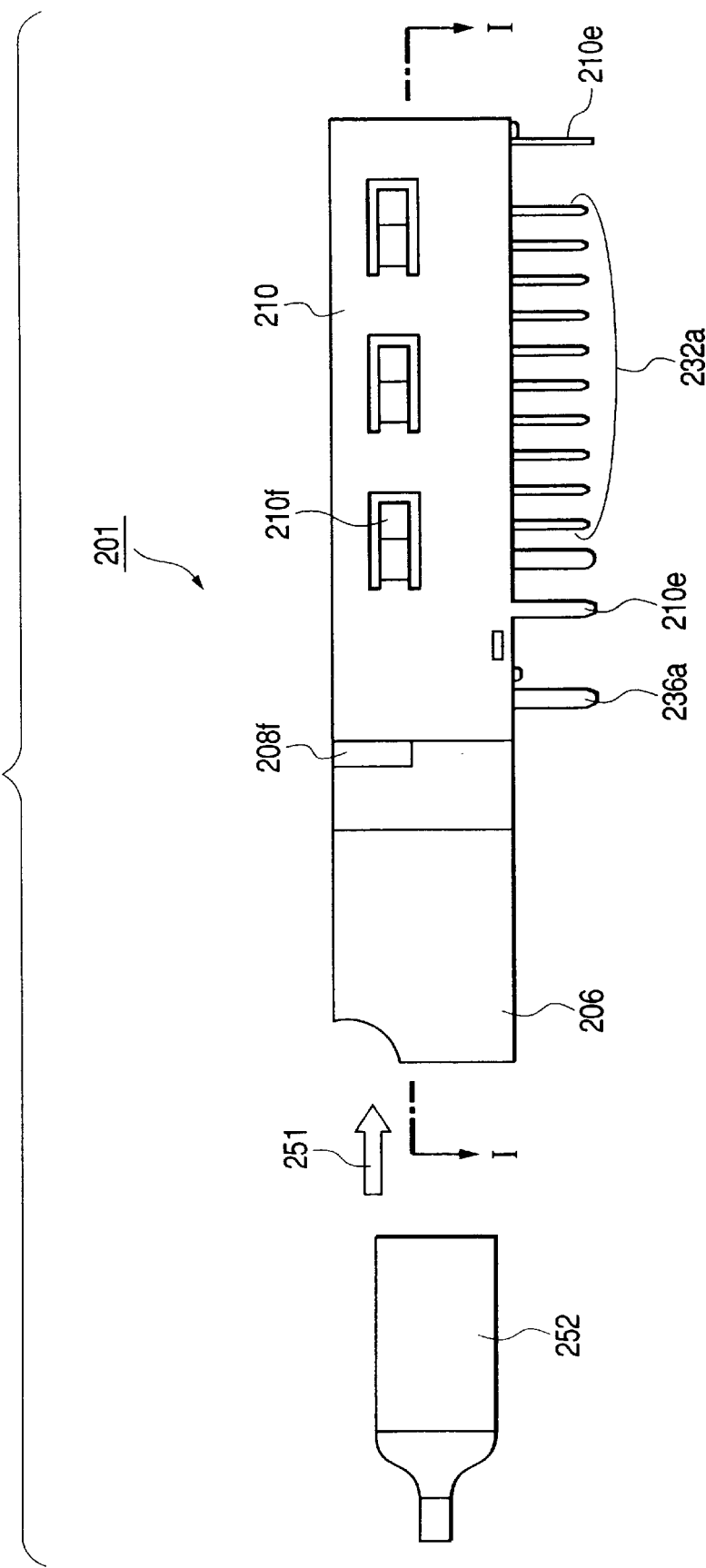
FIG. 17 is a side view showing the optical transceiver according to the third embodiment.

FIG. 17 shows the side view of the optical transceiver 201 according to this embodiment. Into the optical transceiver 201 is inserted an optical connector 252 from the direction shown via an arrow 251.

Figure 18:
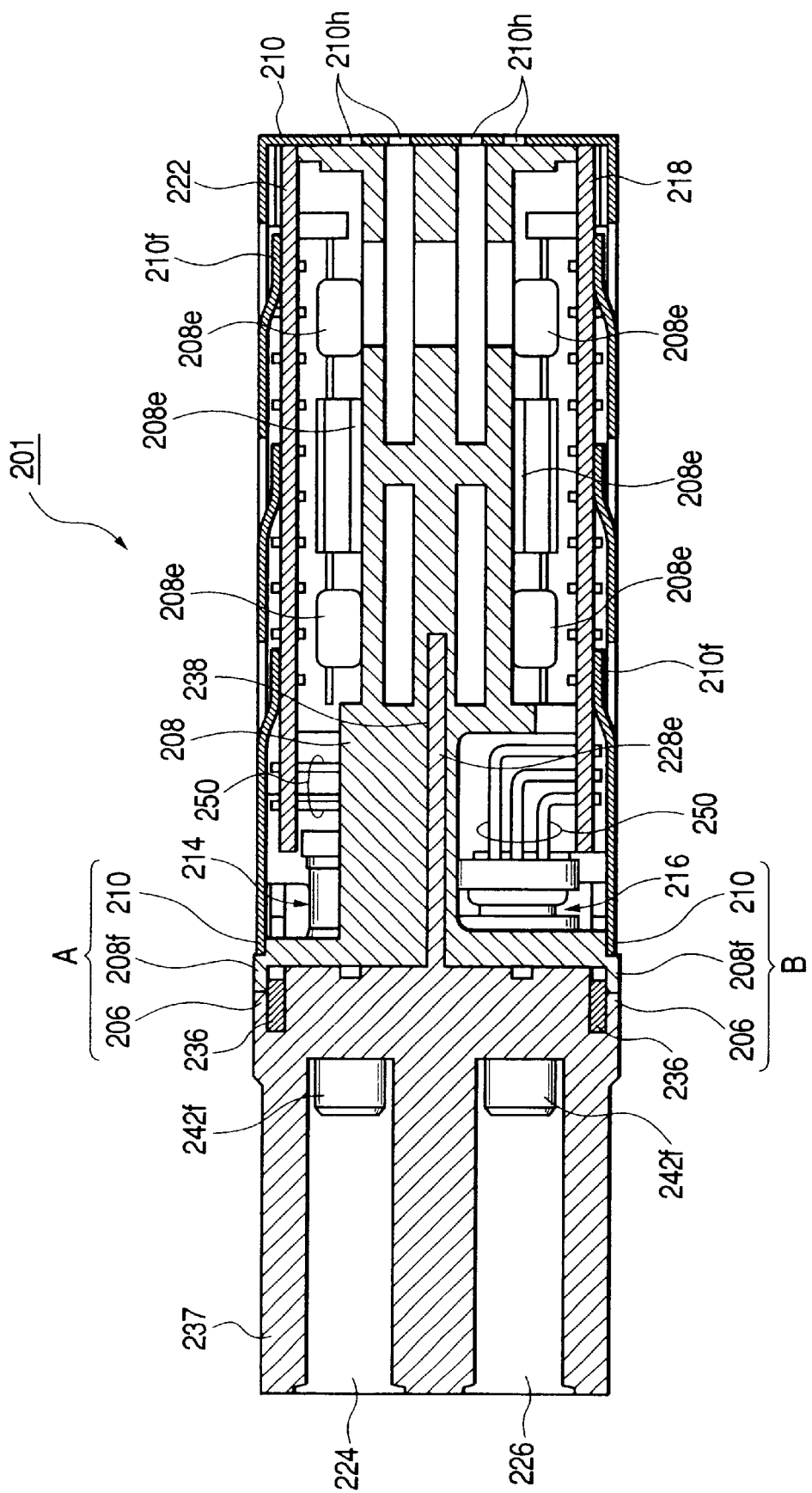
FIG. 18 is a sectional view of the optical transceiver according to the third embodiment taken along the section I—I.

FIG. 18 is a sectional view of an optical transceiver 201 shown in FIG. 17 taken along the section I—I. As understood from this sectional view, in assembled optical converted 201, the mounting member 208 electrically insulates the receptacle part 206 from the covering member 210 as well as insulates the terminal member 236 from the covering member 210 as shown in a portion and B portion. In the optical transceiver 201, the insulating convex part 208f is provided between the receptacle member 206 and the covering member 210. The convex part 208f isolates the receptacle member 206 from the covering member 210 to secure insulation in between when the receptacle member 206, the mounting member 208 and the covering member 210 are assembled to form the housing.

A preferable embodiment electrically isolates the plate film (first shield member) 237 of the receptacle member 206 from the metal covering member (second shield member) 210. This electrical isolation can reduce a noise emitted from the optical transceiver 201 and is effective for reducing bit errors caused by an external electrostatic noise.

As shown in FIG. 18, it is preferable to provide a shield member 238 along the wall 228e of the receptacle member 206. The shield member 238 is arranged between the opto-electrical conversion devices 212 and 214 and thus reduces mutual interference between the opto-electrical conversion devices 212 and 214. This reduces bit errors during signal transmission and reception.

According to a preferable embodiment, the shield 238 can be realized via a plate film formed on the surface of the receptacle member 206 or can be provided as part of the terminal member 236. A conductive member separate from the receptacle member 206 and the terminal member 236 can be applied as a shield member 238. Additionally, it is possible to provide another shield member along the wall 208b of the mounting member 208. Via this shield, mutual interference between the opto-electrical conversion devices 212 and 214 is further reduced.

Figure 19A:
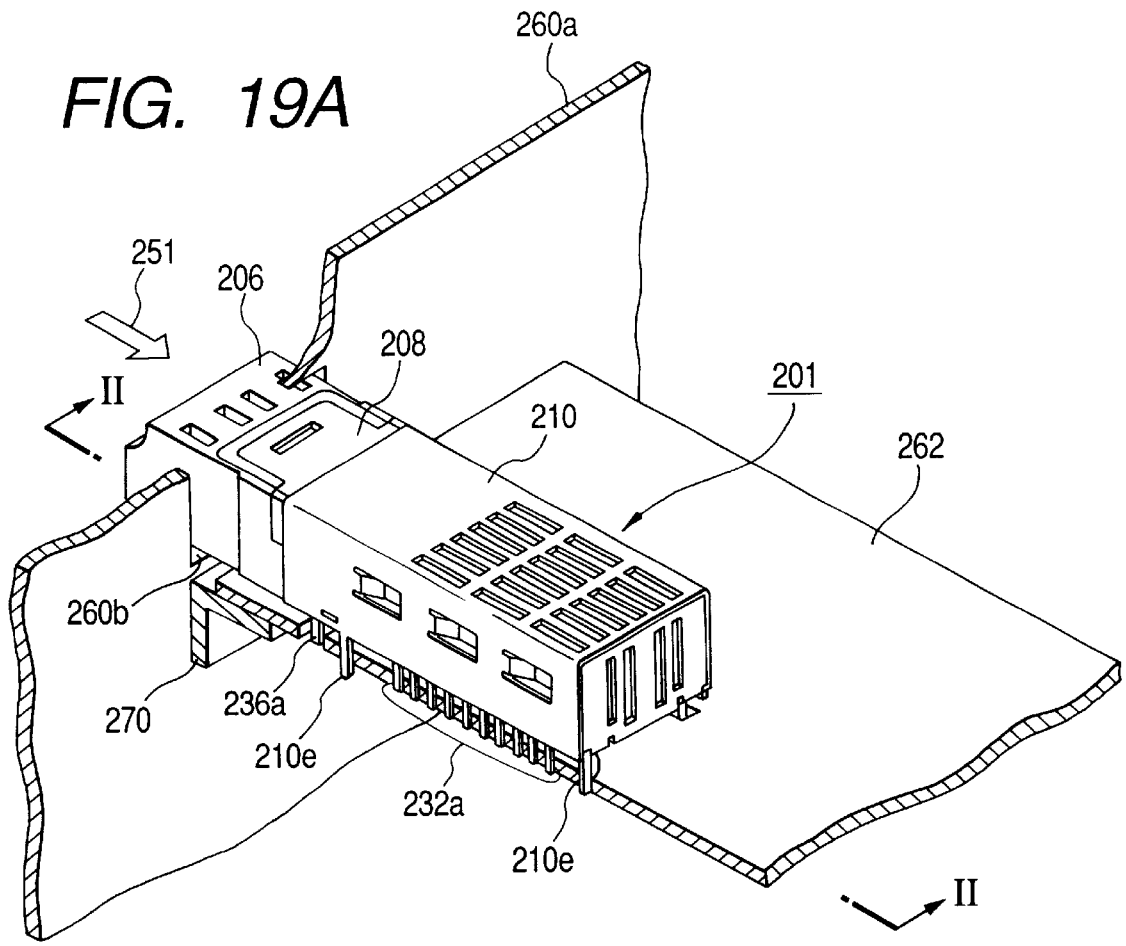
FIGS. 19A and 19B respectively show an embodiment where an optical transceiver according to the third embodiment of the invention is attached to an apparatus.
Figure 19B:
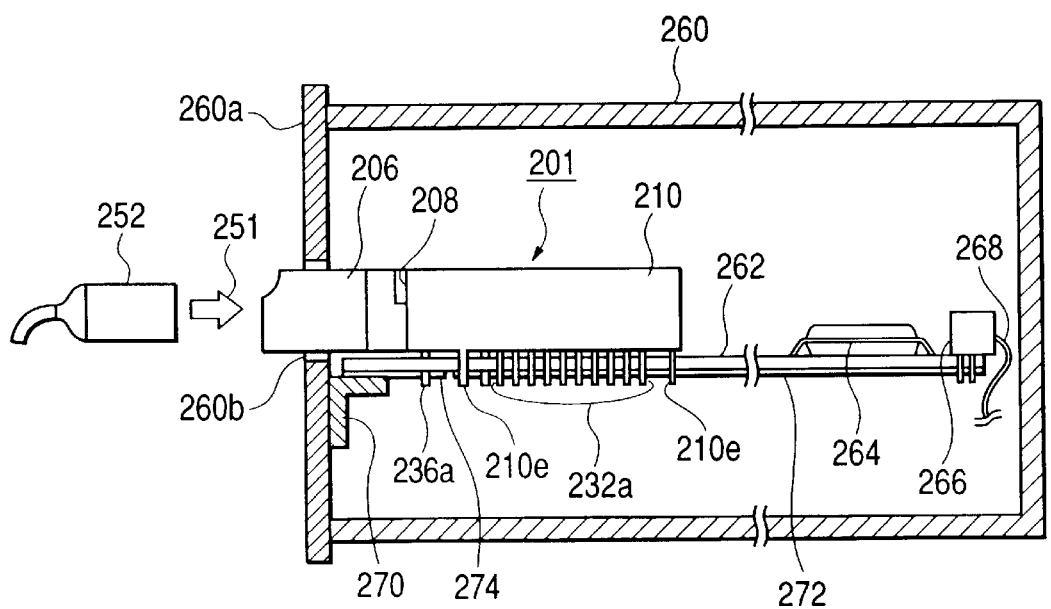

Referring to FIG. 19A and FIG. 19B, a mounting substrate 262 is installed in apparatus 260. The mounting substrate 262 mounts an optical transceiver 201, an electronic components 264 and a connector 266. The connector 266 gives the power supply and the ground potential to the mounting substrate 262 as well as enables input/output of an electric signal. The apparatus 260 comprises a conductive panel 260a, on which a panel opening 260b is provided. In this panel opening 260b appears the opening of the receptacle member 206 of the optical transceiver 201. The mounting substrate 262 is fixed to the panel 260a via a conductive fixing member 270.

FIG. 19B is a sectional view of apparatus 260 taken along the section II—II. On the rear face of the mounting substrate 262 are formed two electrically insulated ground conductive layers 272 and 274. An optical transceiver 201 is mounted on the mounting surface of this mounting substrate 262. The terminal pins 232a are respectively connected to a conductive layer for signals, a conductive layer for power supply and a conductive layer 272 for grounding. The connecting terminal 210e is connected to the conductive layer 272 for grounding. The connecting terminal 236a of the terminal member 236 is connected to the conductive layer 274 for grounding.

As explained earlier referring to a preferable embodiment, in the optical transceiver 201, the receptacle member 206 having the plate film 237 is insulated from the metal covering member 210 via the insulating mounting member 208. Thus, the plate film 237 that serves as a shield member for the receptacle member 206 is connected to the ground conductive layer 274 and the conductive layer 274 is connected to the panel 260a via the fixing member 270. The covering member 210 for shielding the opto-electrical conversion devices 212 and 214 is connected to the signal ground line 272 and further connected to the reference potential line via the connector 266 and a cable 268.

Figure 20A:
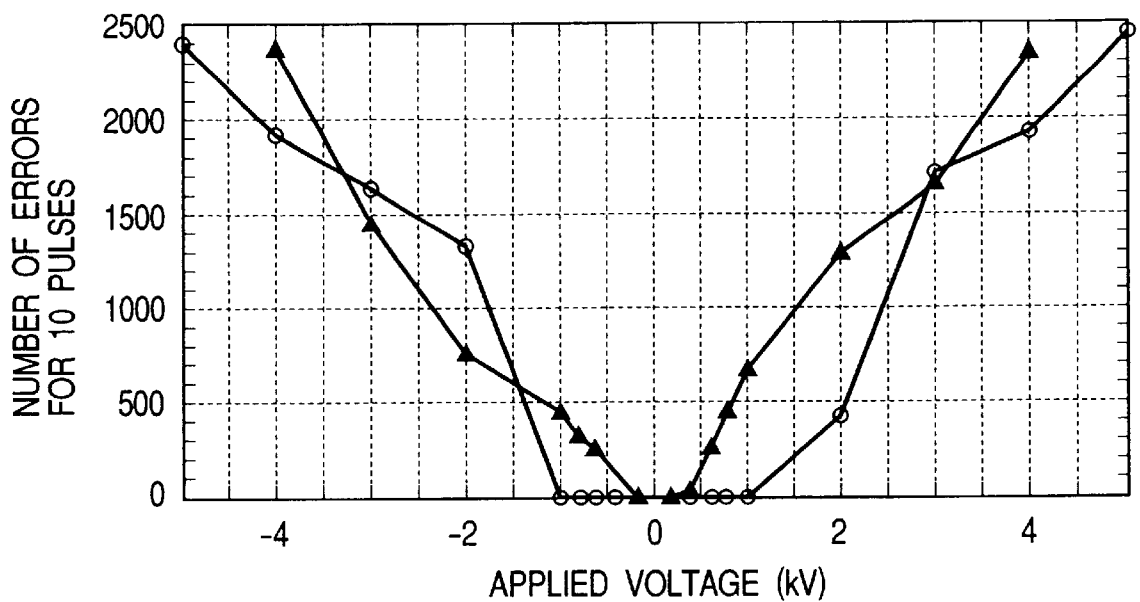
FIGS. 20A and 20B respectively show noise resistance characteristics of the optical transceiver according to the third embodiment of the invention.
Figure 20B:
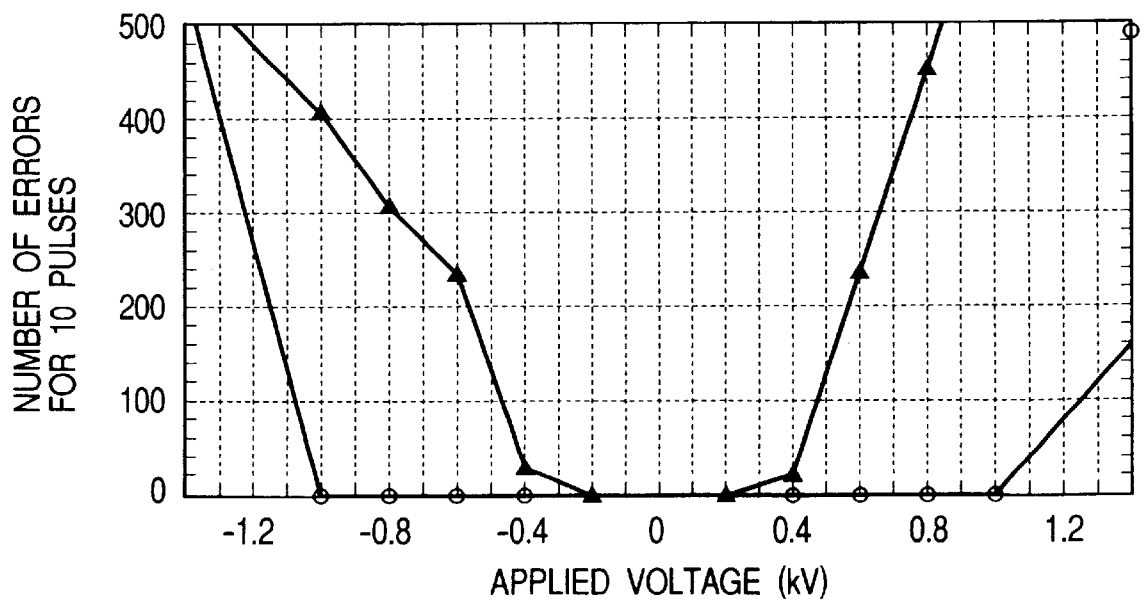

In the arrangement shown in FIGS. 19A and 19B, the electrostatic noise (ESD) resistance of the optical transceiver 201 according to this embodiment has been examined. This experiment recharges the capacitor to a predetermined potential and measures the error bits obtained when the electric charge is discharged to the panel 260a in the foregoing arrangement. In the measurement, the number of error bits were calculated for 10 discharge pulses concerning several charging voltages. Polarities of charging were provided to obtain positive and negative voltages in relation to the reference potential. The results of experiment are shown in FIG. 20A and FIG. 20B. A circle (○) represents data for an optical transceiver that employs the structure of shield isolation according to the embodiment. On the other hand, a triangle (▲) shows experimental results for a an optical transceiver that does not employ the structure of shield isolation. In an optical transceiver where shield isolation is not applied, exceeding an applied voltage of 200 volts generated bit errors. Meanwhile, an optical transceiver according to this embodiment was not subject to bit errors until the applied voltage exceeded 1000 volts.

Figure 21A:
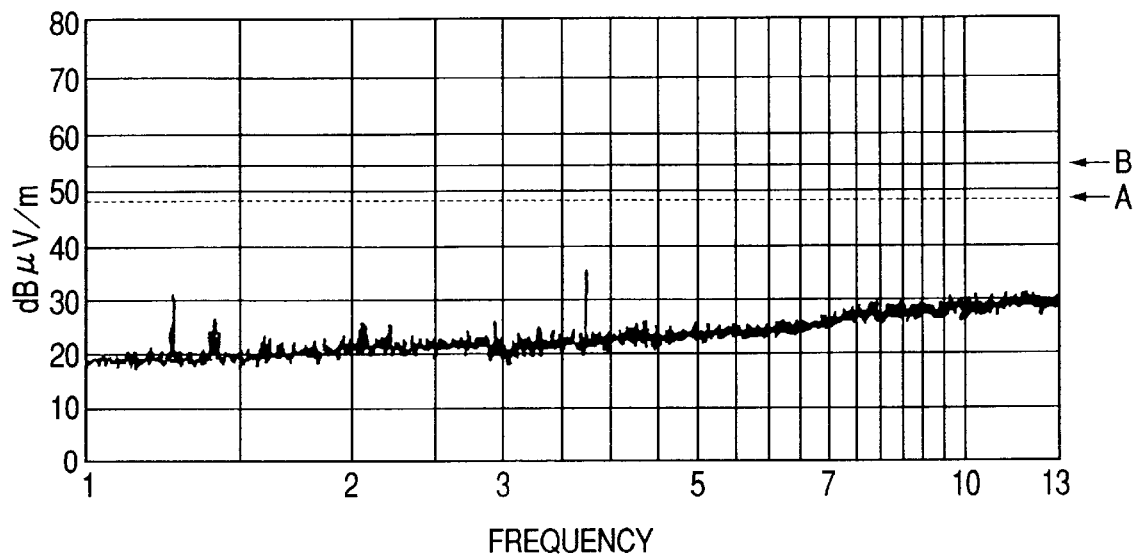
FIGS. 21A and 21B respectively show radiated noise characteristics of the optical transceiver according to the third embodiment of the invention.
Figure 21B:
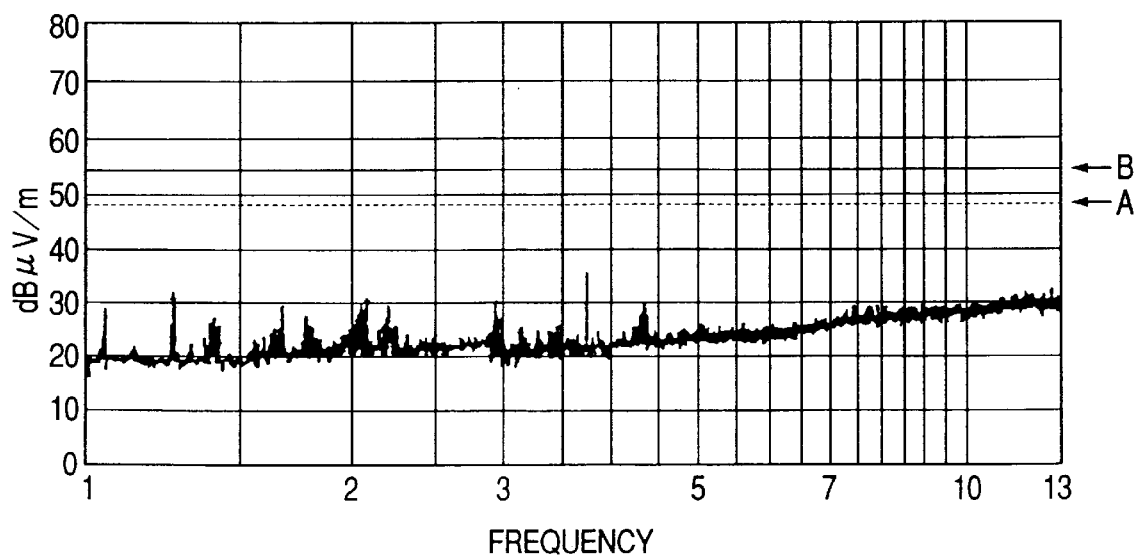
Figure 22:
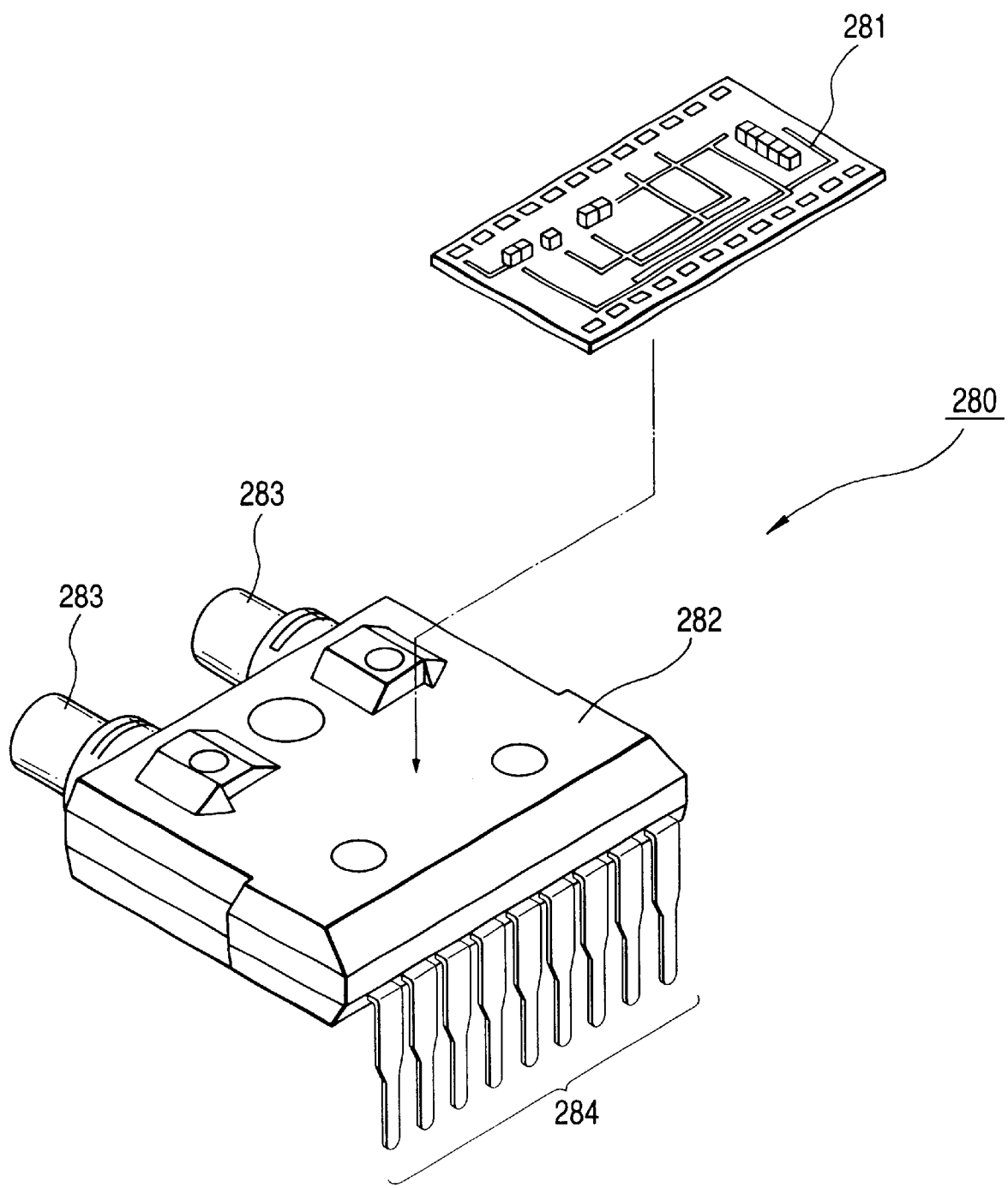
FIG. 22 is a perspective view showing an optical transceiver in related art.

FIG. 21A and FIG. 21B show the measurement results of radiated noise (EMI) characteristics of an optical transceiver according to this embodiment. In these figures, the axis of abscissa represents frequencies and the axis of ordinates represents noise levels in the unit dB μV/m. This measurement was conducted in a radio wave darkroom and the bit rate for transmission/reception by the optical transceiver was 1.25 Gbps. The distance between the measurement samples and the measurement antenna was three meters and experiments were carried out with the plane of polarization of the antenna being horizontal (FIG. 21A) and being vertical (FIG. 21B).

In FIG. 21A and FIG. 21B, Level A represents the tolerance value assumed when operation margin of the optical transceiver is considered and Level B not considered. In any case, characteristics of a practical level are shown.

The aforementioned embodiments are proposed based on the following examination of the inventor. The examination concerns how to make EMI and ESD compatible with each other.

From the viewpoint of radiated noise (EMI) characteristics of the optical transceiver, it is desirable to cover the entire optical transceiver with an electromagnetic shield member and seal the opening of the apparatus with a receptacle member, as well as to connect the shield member of the optical transceiver to the ground potential line of the apparatus cabinet.

On the other hand, from the viewpoint of noise resistance (ESD) characteristics of the optical transceiver, it is desirable to electrically isolate the electromagnetic shield covering the optical transceiver from the ground potential line of the apparatus cabinet.

No related art optical transceivers, however, satisfied the two requirements at the same time. This invention is to solve this problem. An optical transceiver according to preferable embodiments obtained as the result of examination can reduce a radiated noise from the panel opening of the apparatus where the optical transceiver is mounted and shows a better external noise resistance. Further, a drop in the receiving sensitivity of the receiver optical assembly caused by the transmitter optical assembly has been reduced.

Effects on the embodiments of the invention will be explained below. From the viewpoint of a radiated noise, the optical transceiver is a noise source that emits noise from the opening of the apparatus panel. Thus the opening of the apparatus panel should be as small as possible. However this approach has limitations. In order to realize this requirement, the receptacle is covered with a shield member. Via this, effective opening area for noise radiation can be reduced without making the opening of the apparatus panel small. Meanwhile, from the noise resistance, ESD resistance is upgraded by electrically isolating the apparatus such as an apparatus panel cabinet where a high voltage may be applied from the electric circuits that processes subtle signals. In order to realize an embodiment to satisfy this requirement, separate shield members are user for the receptacle and the opto-electrical conversion device.

While the embodiments of the invention have been detailed, the invention is not limited to the foregoing embodiment.

According to the invention, it is possible to dispose a transmitter electronic circuit substrate as a component of the transmitter optical sub-module to be opposite to a receiver electronic circuit substrate as a component of the receiver optical sub-module. Via this approach, it is possible to arrange the transmitter electronic circuit substrate in the close proximity of the receiver electronic circuit substrate and to educe spacing between a light emitting element and a light receiving element.

A conductive substrate is provided between a transceiver optical sub-module and a receiver optical sub-module, and the conductive substrate is provided with a grounding terminal. Via this approach, the conductive substrate acts as an electrical shield plate thus reducing the effects of an electromagnetic noise mutually exerted by the transceiver optical sub-module and the receiver optical sub-module.

Moreover, the cover of the housing composing the optical transceiver is conductive and the cover is provided with a grounding terminal. This reduces the effects of an external electromagnetic noise on the transmitter optical assembly and the receiver optical assembly.

The power supply is fed to the light receiving element and the receiver preamplifier via the two capacitors. The light receiving element is mounted on the parallel-plate capacitor. The stem and the lens holder are made of metal. Thus, it is possible to stabilize the operation of the receiver optical sub assembly (ROSA) for signal speeds exceeding 1 Gbps.

Further, the first and the second shield members are electrically isolated from each other by the mounting member. This electrical isolation can reduce a noise emitted from the optical transceiver and is effective for reducing bit errors caused by an external electrostatic noise. Further, this electrical isolation reduces the electromagnetic effects on the first shield member directly propagated to the second shield member for electrically shielding the opto-electrical conversion devices.

What is claimed is:

1. An optical transceiver comprising:
  a receiver optical sub-module having a light receiving element for receiving an optical signal from a receiver optical fiber, a receiver electronic circuit substrate formed with an electronic circuit for processing an output signal outputted from said light receiving element, and a metal receiver optical sub-assembly for accommodating said light receiving element and having a receiver sleeve engaging with a receiver ferrule provided at a tip of the receiver optical fiber;
  a transmitter optical sub-module, separate and independent from the receiver sub-module, having a light emitting element for transmitting an optical signal to a transmitter optical fiber, and a transmitter electronic circuit substrate formed with an electronic circuit for processing an input signal to be inputted to said light emitting element;
  a housing having a receptacle part engaged with an optical connector accommodating the receiver optical fiber and the transmitter optical fiber, in which said receiver optical sub-module and said transmitter optical sub-module are attached to said housing and are disposed opposite to each other; and
  an electrical shield plate disposed between said receiver optical sub-module and said transmitter optical sub-module, wherein said electrical shield plate is a conducting plate having a grounding terminal, and wherein the electrical shield plate, the receiver optical sub-module, and the transmitter optical sub-module are separate and independent from one another.

2. The optical transceiver according to claim 1, wherein said housing has a mounting portion for mounting said receiver optical sub-module and said transmitter optical sub-module, and a conductive cover for covering the receiver optical sub-module and the transmitter optical sub-module, said conductive cover coupled to the mounting portion and having a grounding terminal.

3. The optical transceiver according to claim 1, wherein the receiver optical sub assembly has a metal stem, a metal lens holder hermetic sealed to said metal stem, and said receiver sleeve made of metal.

4. The optical transceiver according to claim 3, wherein said light receiving element is mounted on a parallel-plate capacitor installed on said metal stem.

5. The optical transceiver according to claim 3, wherein said receiver optical sub assembly has five external lead pins including a ground lead pin provided in a center of the metal stem, said five external lead pins connected to said receiver electronic circuit substrate so that a length of the ground lead pin is shortest.

6. The optical transceiver according to claim 1, said transmitter optical sub-module has a metal transmitter optical sub assembly for accommodating said light emitting element and having a transmitter sleeve engaging with a transmitter ferrule provided at a tip of the transmitter optical fiber, and the receptacle part is engaged with the optical connector accommodating the receiver ferrule of the receiver optical fiber and the transmitter ferrule of the transmitter optical fiber.

7. The optical transceiver according to claim 1, wherein said receiver optical sub assembly has an operating speed equal to or greater than 1.00 Gbps.

8. The optical transceiver according to claim 6, wherein said transmitter optical sub assembly has a metal stem, a metal lens holder hermetic sealed to the metal stem, an aligning member laser welded to the metal lens holder and the transmitter sleeve laser welded to the aligning member.

9. The optical transceiver according to claim 6, wherein said transmitter sleeve has a fiber stub, a holding sleeve for holding the fiber stub, a metal bush for holding the holding sleeve, and a protective member for holding the bush and the holding sleeve.

10. The optical transceiver according to claim 9, wherein a center of said metal stem is inclined against a common optical axis connecting the holding sleeve, said fiber stub and said metal lens holder.

11. The optical transceiver according to claim 8, wherein said transmitter optical sub assembly has at least three lead pins, at least one of the lead pins being electrically connected to said metal stem.

12. The optical transceiver according to claim 6, wherein said transmitter optical sub assembly has an operating speed equal to or greater than 1.0 Gbps.

13. An optical transceiver comprising:
a first opto-electrical conversion device for converting one of an optical signal or an electric signal to the other; and
a housing having a first receptacle for receiving an optical connector, a first shield member for electrically shielding said first receptacle, and a second shield member for electrically shielding said first opto-electrical conversion device, said housing accommodating said first opto-electrical conversion device so that said first opto-electrical conversion device optically connects to the optical connector at said first receptacle;
wherein said housing has a receptacle member in which said first receptacle is formed, and a mounting member for mounting said first opto-electrical conversion device, and said first shield member is isolated from said second shield member and has a conductive member provided on said receptacle member.

14. The optical transceiver according to claim 13, wherein said housing has an insulating member for electrically insulating said first shield member from said second shield member.

15. The optical transceiver according to claim 13, wherein said housing has a receptacle member in which said first receptacle is formed, and a mounting member for mounting said first opto-electrical conversion device, and said second shield member has a conductive covering member for sandwiching said first opto-electrical conversion device against and mounting member.

16. The optical transceiver according to claim 13, wherein said second shield member has a terminal provided to stick out from a substrate mounting surface of said housing.

17. The optical transceiver according to claim 13, wherein said second shield member is connected to a reference potential line of said first opto-electrical conversion device.

18. The optical transceiver according to claim 13, wherein said housing has a first terminal provided at a contact part provided to allow electrical connection to said first shield member, and a second terminal provided to stick out from a substrate mounting surface of said housing.

19. The optical transceiver according to claim 13, further comprising:
a second opto-electrical conversion device for converting one of an optical signal or an electric signal to the other, said second opto-electrical conversion device being electrically shielded by said second shield member; and
said housing having a second receptacle for receiving the optical connector, said housing accommodating said second opto-electrical conversion device so that said second opto-electrical conversion device optically connects to the optical connecter at said second receptacle, said second receptacle being electrically shielded by said first shield member.

20. The optical transceiver according to claim 19, wherein said first shield member is provided to allow shielding between said first opto-electrical conversion device and said second opto-electrical conversion device.

21. The optical transceiver according to claim 13, wherein said conductive member includes a plate coating provided on said receptacle member.

22. The optical transceiver according to claim 13, wherein said receptacle member has a wall disposed between said first and second opto-electrical conversion devices, and said first shielding member has a conductive member provided along the wall of the receptacle member.

* * * * *